United States Patent
McNames et al.

(10) Patent No.: US 11,579,241 B2
(45) Date of Patent: Feb. 14, 2023

(54) WIDEBAND ACOUSTIC POSITIONING WITH PRECISION CALIBRATION AND JOINT PARAMETER ESTIMATION

(71) Applicant: SKYWORKS SOLUTIONS, INC., Irvine, CA (US)

(72) Inventors: James McNames, Portland, OR (US); Amit Kumar, Portland, OR (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 715 days.

(21) Appl. No.: 16/603,486

(22) PCT Filed: Apr. 11, 2018

(86) PCT No.: PCT/US2018/027180
§ 371 (c)(1),
(2) Date: Oct. 7, 2019

(87) PCT Pub. No.: WO2018/191425
PCT Pub. Date: Oct. 18, 2018

(65) Prior Publication Data
US 2021/0003656 A1    Jan. 7, 2021

Related U.S. Application Data

(60) Provisional application No. 62/484,278, filed on Apr. 11, 2017.

(51) Int. Cl.
*G01S 5/18*    (2006.01)
*G01S 3/80*    (2006.01)
*G01S 5/30*    (2006.01)

(52) U.S. Cl.
CPC .............. *G01S 5/18* (2013.01); *G01S 3/8003* (2013.01); *G01S 5/30* (2013.01)

(58) Field of Classification Search
CPC . G01S 5/18; G01S 3/8003; G01S 5/30; G01S 5/22
(Continued)

(56) References Cited

U.S. PATENT DOCUMENTS 6,816,437 B1    11/2004 Teller et al.
2004/0233784 A1    11/2004 Bernard
(Continued)

FOREIGN PATENT DOCUMENTS

WO    WO 2013/171679    11/2013

OTHER PUBLICATIONS

Haller et al., "Sidescan sonar detection performance with PRN coded signals", OCEANS '93, Engineering in Harmony With Ocean, Proceedings Victoria, BC, Canada Oct. 18-21, 1993, New York, NY, USA, IEEE Oct. 18, 1993, pp. I237-I242.
(Continued)

Primary Examiner — Shaima Q Aminzay
(74) Attorney, Agent, or Firm — Lando & Anastasi, LLP

(57) ABSTRACT

A system includes at least one processor and at least one memory storing program instructions that, when executed by the at least one processor, cause the system to send an acoustic ranging transmitter signal between a plurality of calibration reference positions and at least one anchor point, receive an acoustic ranging receiver signal associated with the acoustic ranging transmitter signal and with distances between the plurality of calibration reference positions and the at least one anchor point, and estimate a speed of sound based on the acoustic ranging receiver signal.

22 Claims, 18 Drawing Sheets

(58) Field of Classification Search
USPC .......................................................... 367/13
See application file for complete search history.

(56) References Cited

U.S. PATENT DOCUMENTS

2005/0249360 A1   11/2005  Adcock et al.
2008/0304361 A1* 12/2008  Peng ........................ G01S 15/74
                                                            367/127

OTHER PUBLICATIONS

Office Action from corresponding European Application No. 18784407.1 dated Jun. 2, 2022.
Extended European Search Report for related Application No. 18784407.1, 9 pages, dated Jul. 30, 2020.
International Search Report and Written Opinion for related International Application No. PCT/US2018/027180, 10 pages, dated Jul. 31, 2018.
Kuang et al., "Stratified Sensor Network Self-Calibration From TDOA Measurements," 21$^{st}$ European Signal Processing Conference, 5 pages (Sep. 9-13, 2013).
Ramezani et al., "Target Localization and Tracking for an Isogradient Sound Speed Profile," *IEEE Transactions on Signal Processing*, 61(6):1434-1446 (Mar. 15, 2013).
Waldmeyer et al., "Multi-stage AUV-aided Localization for Underwater Wireless Sensor Networks," 2011 IEEE Workshops of International Conference on Advanced Information Networking and Applications, 7 pages (Mar. 22-25, 2011).
Akiyama et al., "SyncSync: Time-of-arrival Based Localization Method Using Light-synchronized Acoustic Waves for Smartphones," 2015 International Conference on Indoor Positioning and Indoor Navigation, 9 pages (Oct. 2015).
Álvarez et al., "Analysis of the Performance of an Ultrasonic Local Positioning System based on the emission of Kasami codes," 2010 International Conference on Indoor Positioning and Indoor Navigation, 5 pages (Sep. 15-17, 2010).
Cazzorla et al., "A 5.6-GHz UWB Position Measurement System," *IEEE Transaction on Instrumentation and Measurement*, 62(3):675-683 (Mar. 2013).
Chepuri et al., "Sparsity-Exploiting Anchor Placement for Localization in Sensor Networks," arXiv: 1303.4085, 5 pages (Mar. 2013).
Cobos et al., "Simultaneous Ranging and Self-Positioning in Unsynchronized Wireless Acoustic Sensor Networks," *IEEE Transactions on Signal Processing*, 64(22):5993-6004 (Nov. 15, 2016).
De Angelis et al., "Characterization of a Flexible UWB Sensor for Indoor Localization," *IEEE Transactions on Instrumentation and Measurement*, 62(5):905-913 (May 2013).
De Angelis et al., "Design and Characterization of a Portable Ultrasonic Indoor 3-D Positioning System," *IEEE Transactions on Instrumentation and Measurement*, 64(10):2616-2625 (Oct. 2015).
Dwiyasa et al., "A Survey of Problems and Approaches in Wireless-based Indoor Positioning," 2016 International Conference on Indoor Positioning and Indoor Navigation, 7 pages (Oct. 4-7, 2016).
Gaber et al., "A Study of Wireless Indoor Positioning Based on Joint TDOA and DOA Estimation Using 2-D Matrix Pencil Algorithms and IEEE 802.11 ac," *IEEE Transaction on Wireless Communications*, 14(5):2440-2454 (May 2015).
Gu et al., "A Survey of Indoor Positioning Systems for Wireless Personal Networks," *IEEE Communications Surveys & Tutorials*, 11(1):13-32 (Jan. 2009).
Hazas et al., "Broadband Ultrasonic Location Systems for Improved Indoor Positioning," *IEEE Transactions on Mobile Computing*, 5(5):536-547 (May 2006).
Huang et al., "High-Precision Ultrasonic Ranging System Platform Based on Peak-Detected Self-Interference Technique," *IEEE Transactions on Instrumentation and Measurement*, 60(12):3775-3780 (Dec. 2011).
Knapp et al., "The Generalized Correlation Method for Estimation of Time Delay," *IEEE Transactions on Acoustics, Speech, and Signal Processing*, ASSP—24(4):320-326 (Aug. 1976).
Mautz et al., "Survey of Optical Indoor Positioning Systems," 2011 International Conference on Indoor Positioning and Indoor Navigation, 7 pages (Sep. 21-23, 2011).
Maxim, "Low-Cost, Micropower, SC&/SOT23-8, Microphone Preamplifiers with Complete Shutdown," 15 pages, Apr. 2001 Maxim Integrated Products datasheet.
Medina et al., "Feasibility of ultrasound positioning based on signal strength," 2012 International Conference on Indoor Positioning and Indoor Navigation, 9 pages (Nov. 13-15, 2012).
Monica et al., "UWB-Based Localization in Large Indoor Scenarios: Optimized Placement of Anchor Nodes," *IEEE Transaction on Aerospace and Electronic Systems*, 51(2):987-999 (Apr. 2015).
Nazemzadeh et al., "Optimal Placement of Landmarks for Indoor Localization using Sensors with a Limited Range," 2016 International Conference on Indoor Positioning and Indoor Navigation, 8 pages, (Oct. 4-7, 2016).
Priyantha et al., "Mobile-Assisted Localization in Wireless Sensor Networks," 2005 International Conference on Computer Communications, 12 pages (Mar. 13-17, 2005).
Queirós et al., "Cross-Correlation and Sine-Fitting techniques for High-Resolution Ultrasonic Ranging," *IEEE Transactions on Instrumentation and Measurement*, 59(12):3227-3236 (Dec. 2010).
Saad et al., "High-Accuracy Reference-Free Ultrasonic Location Estimation," *IEEE Transactions on Instrumentation and Measurement*, 61(6):1561-1570 (Jun. 2012).
Tiemann et al., "ATLAS—An Open-Source TDOA-based Ultra-Wideband Localization System," 2016 International Conference on Indoor Positioning and Indoor Navigation, 6 pages (Oct. 4-7, 2016).
Wang et al., "Anchor-Based Three-Dimensional Localization Using Range Measurements," 2012 8$^{th}$ International Conference on Wireless Communication, Networking and Mobile Computing, 5 pages (Sep. 21-23, 2012).
Van de Velde et al., "Fast and robust anchor calibration in range-based wireless localization," 7th International Conference on Signal Processing and Communication Systems , 6 pages (Dec. 2013).

\* cited by examiner

WIDEBAND ACOUSTIC POSITIONING WITH PRECISION CALIBRATION AND JOINT PARAMETER ESTIMATION

CROSS REFERENCE TO RELATED APPLICATIONS

This is the U.S. National Stage of International Application No. PCT/US2018/027180, filed on Apr. 11, 2018, which was published in English under PCT Article 21(2), which in turn claims the benefit of U.S. Provisional Application No. 62/484,278, filed on Apr. 11, 2017. The provisional application is incorporated herein in its entirety.

FIELD

The field pertains to acoustic positioning and calibration.

BACKGROUND

Indoor positioning has a variety of applications, including ones that require positioning accuracy of better than a millimeter. Estimates of the positions of a set of one or more points can be used to determine the shape and orientation of an object, which can be useful in, among other things, clinical research of human kinematics, virtual reality, assisted reality, fine gesture control, and motion capture for the entertainment industry. Advances in sensor technologies, wireless connectivity, and low-power computing are enabling widespread deployment of such positioning instruments.

A review of recent publications in the field of indoor positioning [1]-[3] evinces three categories of positioning schemes based on the type of signals they use: optical methods including laser and IR-based equipments [4], acoustic methods, and radio frequency or RF-based methods. The optical methods typically offer the most accuracy, whereas the acoustic and the RF methods are cheaper and easier to deploy [1], [2], [4]. Hence there remains a need in closing the gap by improving the accuracy of non-optimal methods. In the examples described below, acoustic methods and apparatus are described. According to published literature, acoustic methods [5]-[8] tend to provide better positioning accuracy than RF based methods [9]-[12]. As it will be appreciated from the discussion hereinbelow, this advantage emanates from two factors. First, the speed of sound in air is much slower than the speed of radio waves, which reduces the uncertainties in range estimation due to timing errors. Second, for the same wavelength of the ranging signal, say 0.01 meters for example, the frequency of an acoustic wave falls in a more convenient band (34.5 kHz for the above example) than that of the radio waves (30 GHz). The smaller wavelength allows higher resolution in spatial measurements.

However, acoustic methods still fail to realize their full potential despite these advantages. Therefore, a need remains to exploit the potential of acoustic positioning accuracies.

SUMMARY

According to an aspect of the disclosed technology, systems include at least one processor, and at least one memory storing program instructions that, when executed by the at least one processor, cause the system to send an acoustic ranging transmitter signal between a plurality of calibration reference positions and at least one anchor point, receive an acoustic ranging receiver signal associated with the acoustic ranging transmitter signal and with distances between the plurality of calibration reference positions and the at least one anchor point, and estimate a speed of sound based on the acoustic ranging receiver signal.

In some embodiments, the estimating includes jointly estimating the positions of the at least one anchor point with the speed of sound and a signal acquisition delay associated with a time difference between the sending of the acoustic ranging transmitter signal and the receiving of the acoustic ranging receiver signal.

In some examples, the sending the acoustic ranging transmitter between the plurality of calibration reference positions and the at least one anchor point is from the plurality of calibration reference positions to the at least one anchor point.

With some embodiments, the sending of the acoustic ranging transmitter between the plurality of calibration reference positions and the at least one anchor point is from the at least one anchor point to the plurality of calibration reference positions. In some examples, the at least one memory stores program instructions that, when executed by the at least one processor, cause the system to estimate a position of an object based on the estimates of the speed of sound, signal acquisition delay, and anchor point positions.

In selected examples, the at least one anchor point includes a plurality of anchor points and wherein the estimation of the speed of sound is based on a time difference of arrival of the acoustic ranging receiver signal. In some embodiments, the calibration reference positions are unknown. In further embodiments, systems further include estimating the positions of the plurality of anchor points based on a time of arrival of the acoustic ranging receiver signals, and the speed of sound estimate. Additional embodiments include jointly estimating positions of the plurality of anchor points with the estimation of the speed of sound and a signal acquisition delay. In some joint estimation examples, the plurality of anchor points includes a quantity of anchor points defined in relation to the number of calibration references positions that does not under-determine a corresponding system of equations.

In further examples, the estimating is based on a time of arrival between the sending and the receiving for each calibration reference position and the at least one anchor point. Some embodiments include jointly estimating positions of the at least one anchor point and a signal acquisition delay with the estimating of the speed of sound. Further embodiments estimation with optimizing a performance criterion associated with N calibration parameters, wherein the quantity of the plurality of calibration reference positions is at least N+1.

Some examples further include at least one acoustic transmitter situated to send the acoustic ranging transmitter signal, and at least one acoustic receiver situated to receive the acoustic ranging receiver signal. In further examples, the at least one acoustic transmitter and at least one acoustic receiver are in wireless communication with the at least one processor and at least one memory.

In some embodiments, estimation of the speed of sound is obtained with a nonlinear regression. In further examples, the nonlinear regressions includes a minimization of an error based on least squares.

In typical examples, the acoustic the ranging transmitter signal is a wideband acoustic signal.

In representative joint estimation or signal acquisition delay estimation examples, the estimating the signal acquisition delay is based on (i) a peak cross-correlation between the acoustic ranging receiver signal and a signature signal and (ii) a signature time of the signature signal.

In different examples, the at least one anchor point includes an acoustic transmitter or an acoustic receiver. In representative examples, the acoustic transmitter is a speaker and the acoustic receiver is a microphone.

According to a further aspect of the disclosed technology, methods include sending an acoustic ranging transmitter signal between a plurality of calibration reference positions and at least one anchor point, receiving an acoustic ranging receiver signal associated with the acoustic ranging transmit signal and with distances between the plurality of calibration reference positions and the at least one anchor point, and estimating a speed of sound, a signal acquisition delay, and a position of the at least one anchor point based on the acoustic ranging receiver signal.

According to another aspect of the disclosed technology, methods include positioning an acoustic transmitter at each of a plurality of calibration reference positions, at each calibration reference position, sending an acoustic ranging transmitter signal from the acoustic transmitter and receiving the acoustic ranging transmitter signal with one or more acoustic receivers situated at respective anchor points of an acoustic detection volume, and estimating a speed of sound based on the received acoustic ranging transmit signals.

The foregoing and other objects, features, and advantages of the disclosed technology will become more apparent from the following detailed description, which proceeds with reference to the accompanying figures.

DETAILED DESCRIPTION

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Examples can be described with respect to locations and positions, which can be understood as synonymous or interchangeable in many examples.

Reference is made herein with brackets to documents that are listed herein under the heading "REFERENCES INCORPORATED HEREIN BY REFERENCE."

I. Introduction

Figure 1:
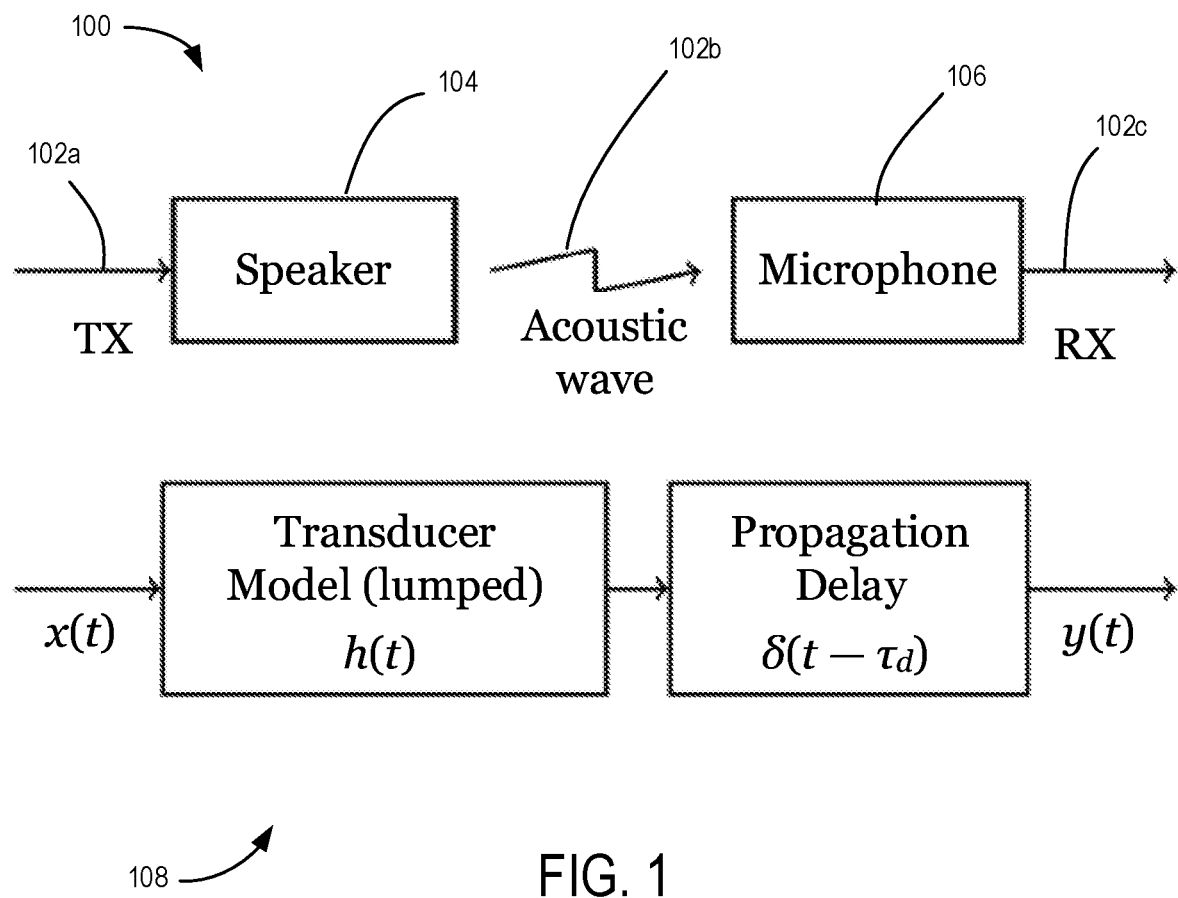
FIG. 1 is a schematic of a signal flow for ranging (top) and a lumped parameter model (bottom).
Figure 2:
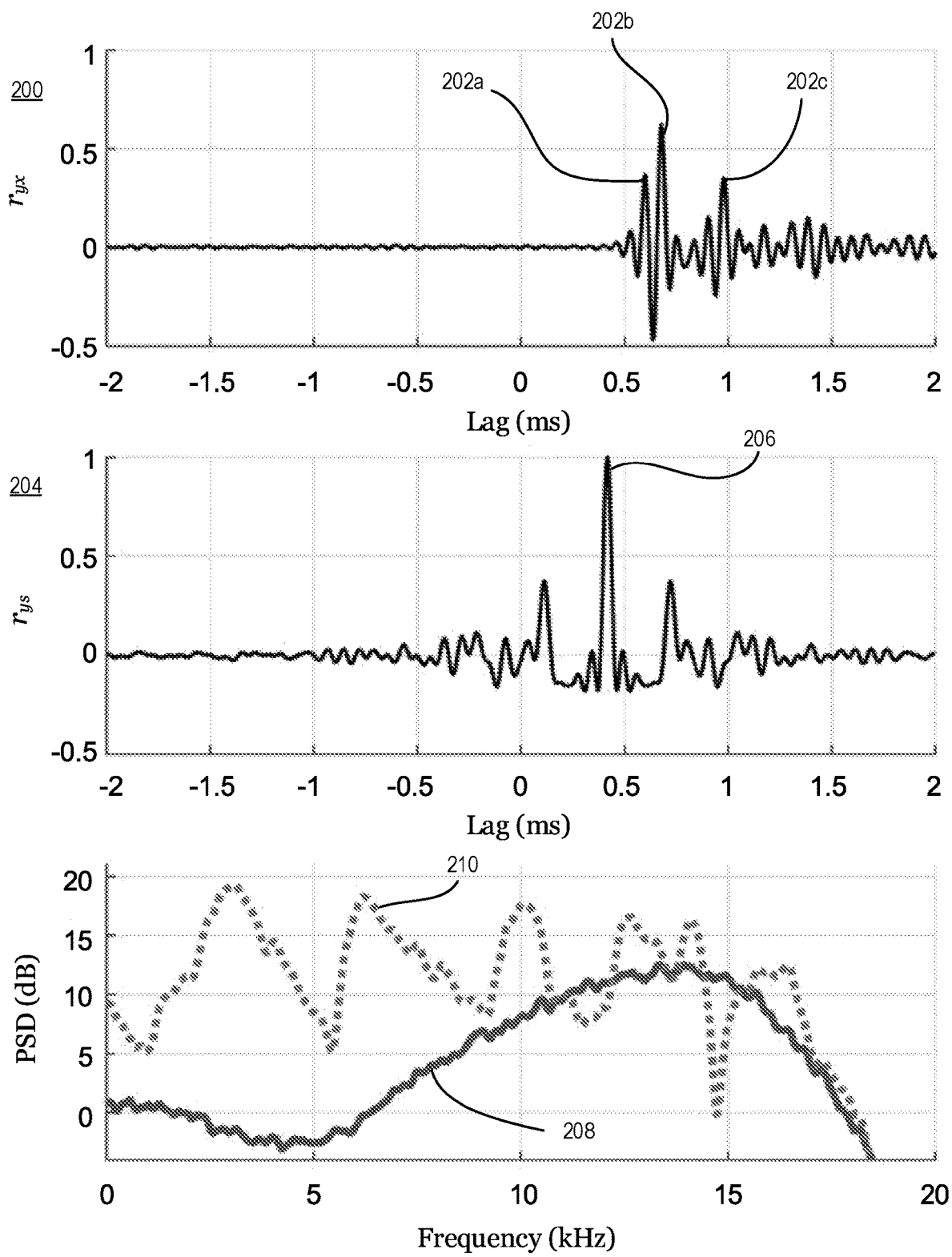
FIG. 2 is multiple graphs of an example of cross-correlation between the recorded ranging signal and the transmitted ranging signal (top), a cross-correlation of the recorded signal with the signature signal (middle), and spectra of the transmitted and signature signals (bottom).

FIG. 1 in the survey by Mainetti et al. [1] and FIG. 2 in the survey by Mautz [2] both agree and neatly show that the most precise acoustic systems tend to offer accuracy of about 0.01 m. While there have been some publications reporting sub-millimeter accuracy in one-dimensional ranging [13], [14], they have not performed three-dimensional positioning. Among the set of 3-D acoustic positioning systems, Cobos et al. [8] and Akiyama et al. [15] have presented work that represent the more accurate positioning systems with an accuracy of about 0.001 m.

It should also be noted that various acoustic positioning systems can be classified as either narrowband [13], [16]-[18] or wideband [5]-[7], [19], where the later systems tend to be more precise as well as more robust. Typically, acoustic positioning involves estimation of either the distance or the direction of the test object relative to a few anchor points. The positions of the anchor points are either known or are estimated as part of a calibration process. Additionally, a few other parameters, such as the speed of sound, and the delays through the data acquisition hardware, also need to be estimated before the position of the test object can be estimated. Estimation of the speed of sound in air is non-trivial since it depends on environmental factors like temperature. Most of the published methods use an open-loop estimate of the speed of sound with temperature compensation. Any error in the estimated values of the parameters directly affects the positioning accuracy of the instrument. The work by Akiyama et al. [15] is an example of calibration errors limiting the performance of the system. This is observable as the standard deviation of positioning error being dwarfed by the mean positioning error, which points to systemic biases. The work of Dwiyasa and Lim [20] also demonstrates that the performance of a positioning system depends greatly on the accuracy of system parameters.

Method examples are presented that use one or more transmitted pseudo-random broadband signals with desirable autocorrelation properties to estimate the distance between two points. This process is called ranging. The location of the test object (also referred to as the tag) is computed using the estimates of its distance from a set of known anchor points. The anchor points themselves are localized, as part of an initial calibration process, using ranging measurements performed at a set of reference locations. Reference locations are points with known coordinates where the tag can be positioned with high precision. This calibration step jointly estimates all the parameters required for positioning, including the speed of sound, the instrumentation delays, as well as the location of the anchor points. This process finds the globally optimal set of parameters that minimizes the chosen error metric. Furthermore, the measurements for calibration are made using high-precision instruments to eliminate mechanical sources of errors. Example prototype instruments are also presented, which was used to implement and evaluate method examples of the disclosed technology. The prototype example was built using readily available off-the-shelf components. While it did not make use of the higher bandwidth available in the ultrasonic band, it was still able to achieve sub-millimeter three-dimensional positioning accuracy, which is significantly better than other published methods of comparable complexity.

II. Methods

A. Acoustic Ranging

The purpose of ranging, in context of method and apparatus examples herein, is to obtain a metric that changes linearly with the Euclidean distance between two points. FIG. 1 shows a flow 100 of a ranging signal 102a-102c from a transmitter 104 to a receiver 106. The transmitter (TX) 104 plays the audio signal 102a through a speaker. The receiver (RX) 106 senses the resulting acoustic wave 102b using a microphone. The speaker and the microphone can be combined into one linear time-invariant (LTI) system with impulse response h(t), corresponding to an equivalent lumped parameter model 108. Assuming that a lumped transducer impulse response of the flow 100 is h(t), that the system is linear time-invariant (LTI), and the propagation delay is $\tau_d$ (modeled by the delayed dirac-delta function), the received signal is $$y(t)=x(t-\tau_d)*h(t) \qquad (1)$$

where * represents the convolution operation. Finding the peak or a selected peak of the cross-correlation function between two signals is a way of finding the delay between them. The cross-correlation $r_{yx}(\tau)$ between the received signal y(t) and the transmitted signal x(t) is given by $$r_{yx}(\tau)=r_{xx}(\tau-\tau_d)*h(\tau) \qquad (2)$$

where $r_{xx}(\tau)$ is the autocorrelation function of the transmitted signal. Because of the convolution in (2), the cross-correlation function is not guaranteed to have a single distinct peak as illustrated in FIG. 2.

FIG. 2, top, shows an example of cross-correlation 200 between a recorded ranging signal and a transmitted ranging signal. Multiple peaks 202a-202c can be observed which make lag measurement difficult. FIG. 2, middle, shows a cross-correlation 204 of the recorded signal with a signature signal (discussed further below). The single distinct peak 206 is easier to detect. FIG. 2, bottom, shows spectra of the transmitted and signature signals 208, 210. The transmitted signal 208, shown by a solid curve, is pre-equalized such that the signature signal (dotted curve) has sufficiently uniform energy distribution in 5 kHz to 15 kHz band. The narrowband fluctuations, which may be associated with cavity resonances in the speaker and microphone enclosures, lead to some secondary peaks in the auto-correlation. But these are typically small relative to the main peak and can be ignored in typical examples.

A new signal, s(t), can be defined called the signature signal, as $$s(t)=x(t-\tau_s)*h(t) \qquad (3)$$

where $\tau_s$ is a constant that depends on how s(t) is recorded. In typical examples, the signature signal is physically recorded with a microphone or other acoustic receiver, as opposed to analytically computed or simulated. Hardware and software that are used to produce the recording can each contribute to the signature time delay $\tau_s$ which is typically unknown.

Comparing (1) and (3), it is noted that $$y(t)=s(t-(\tau_d-\tau_s)) \qquad (4)$$

Hence the cross-correlation $r_{ys}(\tau)$, between the received ranging signal y(t) and the signature signal s(t), is $$r_{ys}(\tau) = r_{ss}(\tau - (\tau_d - \tau_s)) \quad (5)$$

where $r_{ss}(\tau)$ is the autocorrelation function of the signature signal s(t). Since, according to (5), $r_{ys}(\tau)$ is equivalent to a delayed autocorrelation function of s(t), the transmitted signal x(t) can be designed to make $r_{ys}(\tau)$ as impulse-like as possible. The lag, $\tau_m$, corresponding to the peak, is given by $$\tau_m = \arg\max_\tau r_{ys}(\tau) = \tau_d - \tau_s \quad (6)$$

The ranging metric, $$d = \tau_d \times c = (\tau_m + \tau_s)c \quad (7)$$

where d is the estimate of the distance between the transmitter and the receiver and c is the speed of sound. Thus, the ranging measurement can include transmitting a signal x(t), and finding the lag corresponding to a peak cross-correlation between the received signal y(t) and a signature signal s(t).

In representative examples, the shape of the cross-correlation function $r_{ys}(\tau)$ is the same as the autocorrelation function of the signature signal s(t). The autocorrelation function and the power spectral density (PSD) of a signal are related by Fourier transform. To obtain a sharp peak in $r_{ys}(\tau)$, which is desirable for accurate estimation, the signature signal can be selected to be broadband. In some examples, a peak width is less than about 100×, 50×, 20×, or 10× of a selected ranging measurement precision. In limit, for $r_{ys}(\tau)$ to be an impulse-shaped peak (e.g., corresponding to a single sample), s(t) should be white. In some examples herein, this may be achieved by designing a whitening filter for the response of system response in FIG. 1 (e.g., before the TX in FIG. 1) to a white noise input, say, w(t). Let the impulse response of this whitening filter be g(t). Note that g(t) can be thought of as an approximation of the inverse of the system response h(t). The transmit signal x(t) is obtained as the convolution in (8).

$$x(t) = w(t) * g(t) \quad (8)$$

The corresponding signature signal s(t) is obtained using (3). The example shown in FIG. 2 used a finite impulse response (FIR) whitening filter designed using least-square estimation. The FIR length was limited to 4 taps at a 48 kHz sample rate, which was found to be the shortest length to provide sufficient whitening in one prototype example. An alternative to pre-whitening can be to use one of the many generalized cross-correlation (GCC) techniques [21], such as GCC-PHAT, GCC-ROTH, or GCC-SCOT, by way of example.

Figure 3:
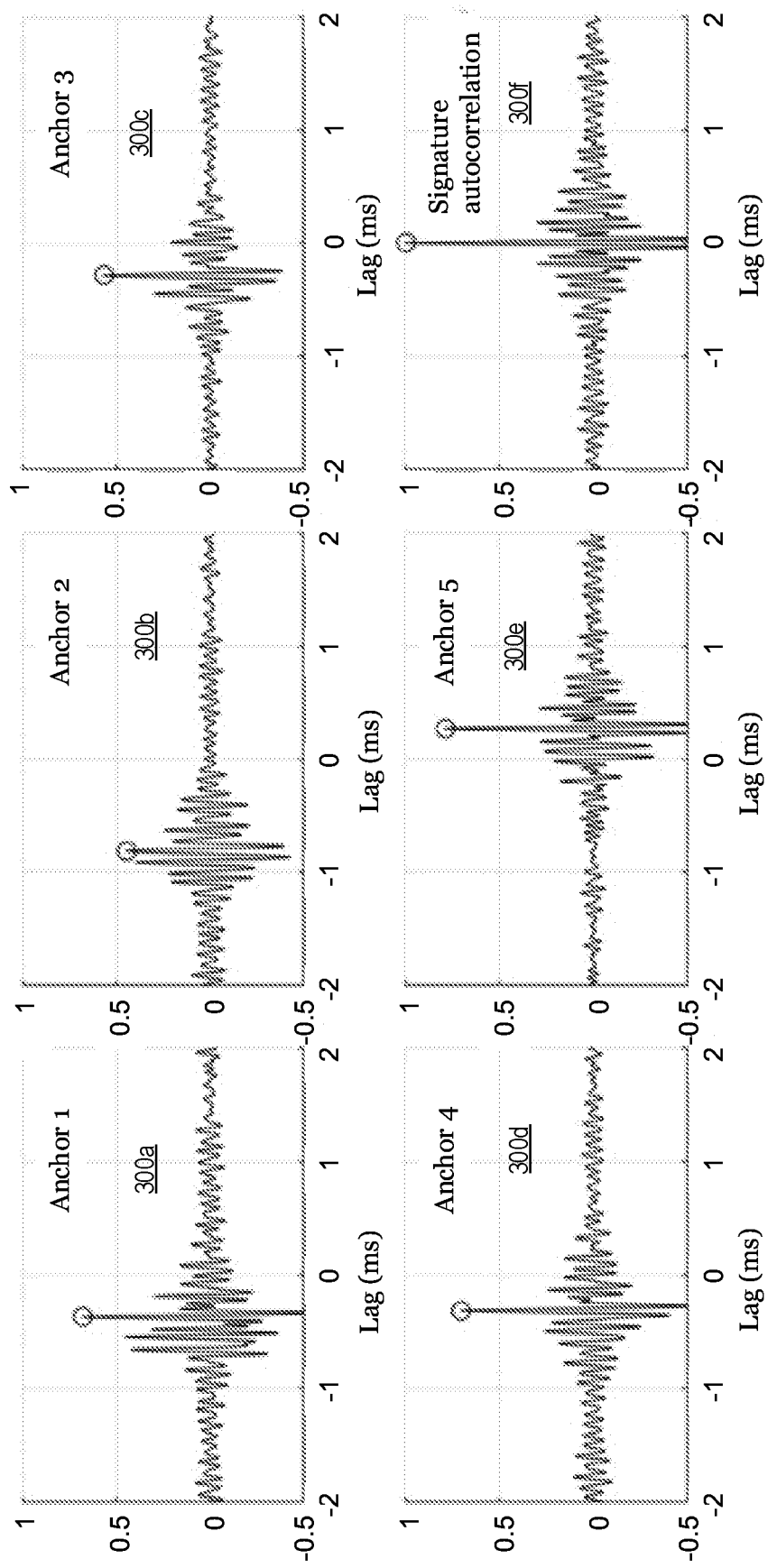
FIG. 3 is multiple graphs of an example of cross-correlation between the signature signal and the signal received by various anchors simultaneously.

The sample-rate for discrete-time representation of the signal was chosen to be 192 kHz, the highest setting supported by the audio interface instrument. This, being roughly 20 times the signal bandwidth, provided enough resolution in lag-domain to easily detect all correlation peaks. In some instances, the acoustic echoes, presumably from the room and instrumentation, had a significant impact on the received signal. As an example, FIG. 3 shows the cross-correlation sequences 300a-300e between the signature signal and the signal simultaneously received by five different anchors, for one such instance. The lag in the subplots is relative to the delay $\tau_s(3)$ in the signature signal recording. The circular markers represent the peak correlation. For most of the anchors (particularly anchors 4 and 5), the cross-correlation sequence matched the expected waveform, which is represented by the autocorrelation sequence 300f of the signature signal in the same figure, but strong echoes can be seen in the signal from Anchor 2. This can be problematic because the peak due to the echo 302 can sometimes be stronger than the fundamental peak 304. To reject such echoes, a modified peak selection algorithm was used, where the earliest peak, not smaller than three-fourths of the largest peak, in the cross-correlation sequence was selected as the peak of interest. This scheme worked reliably, helped by the fact that a strong line-of-sight component was present. However, in setups where an unusually strong echo is expected, a more complex scheme to filter out multipaths, like the one proposed by Alvareź et al. [7], can be used. Once the correct peak was identified, its exact location was estimated using bandlimited interpolation of the correlation sequence around the peak. For example, the signal can be sampled and processed at a selected sample-rate with the time between two consecutive samples having a fixed interval. Depending on how the sampling instants are aligned with the correlation peak, the peak may not precisely overlie a sample. To provide an estimate for the location of the peak that lies between two recorded samples with better resolution that the sample interval, bandlimited interpolation can be used.

B. Position Estimation

The position of the mobile device, which can be called the tag, is derived from the estimates of its distance from a set of fixed anchor points [22]. For unique determination of the position in the three-dimensional space, there need to be at least four non-planar anchor points [23]. Let $a_x(i)$, $a_y(i)$ and $a_z(i)$ respectively represent the x, y and z coordinates of the ith anchor, for $1 \leq i \leq M$, where M is the total number of anchors. Let the estimated distance of the tag from the ith anchor point be represented by d(i). Then the coordinates of the tag are taken to be the set $\{t_x, t_y, t_z\}$ that minimizes the following squared-error metric e.

$$e = \sum_{i=1}^{M} \left( d(i)^2 - \sum_{w \in \{x,y,z\}} [a_w(i) - t_w]^2 \right)^2 \quad (9)$$

where the second summation over w computes the square of Euclidean distance between the anchor and the estimated coordinates by summing the square of the difference between their x, y, and z coordinates. This expression uses square of Euclidean distances to avoid square-roots and maintain polynomial form, which is differentiable at all points and is more conducive to minimization using numerical methods.

C. Localization of the Anchors

Figure 4:
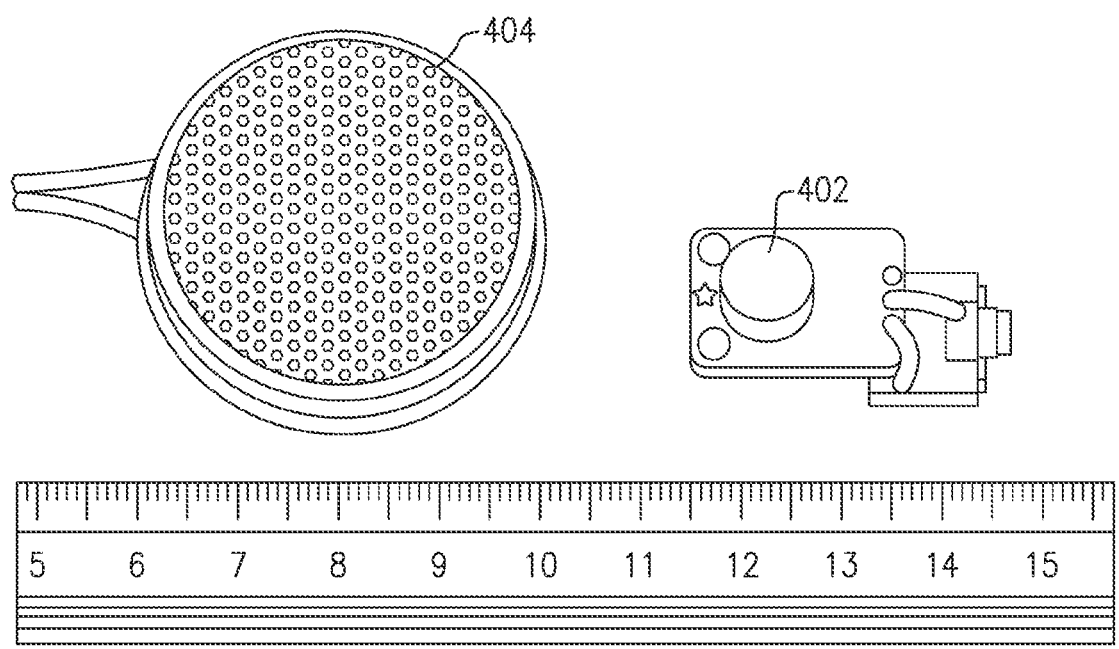
FIG. 4 is a picture of speaker and microphone elements used in experiments herein.

Before the position of the tag can be estimated, the positions of the anchors need to be determined [24]. This process can be understood to be anchor localization. In representative embodiments, the accuracy of anchor localization is similar to or better than the accuracy desired for the final tag positioning because the positioning depends on distance relative to the coordinates of the anchors (9). The desired accuracy in our system is less than a millimeter. It is difficult to achieve this level of precision in measuring the 3D coordinates of a point using traditional length measurement instruments like ruler, tape measure or laser range finder. Another problem in the localization can arise from anchors not being point objects. In typical examples, an anchor can be either a microphone or a speaker, both of which are typically an order of magnitude larger than the desired accuracy. In our experiments, both microphones 402 and speakers 404 were cylindrical in shape as shown in FIG. 4. The microphone 402 is the cylindrical object mounted on the PCB and the larger black cylinder 404 is the speaker, with the ruler markings being in cm. The diameter and the height of the microphone transducer were, respectively, 9.6 mm and 5 mm. The same numbers for the speaker transducer are 39 mm and 13 mm. So, instead of a direct physical length measurement, an acoustic ranging-based method can be used. This is similar to the approach described in the previous section. The same setup, which is eventually used for tag positioning, can be repurposed for this step. In some examples, acoustic ranging measurements are made at a few reference points—a subset of all possible locations of the tag, for which the exact coordinates are known. The ranging data, combined with the known coordinates of the reference points, is used to get an estimate of the coordinates of the anchor points. Similar to positioning, nonlinear regression is used to compute the estimates. As an added advantage, the same optimization process also yields estimates of the speed of sound and the time-offset parameter $\tau_s$ (3) of the signature signal. At least four reference points would be needed to estimate the 3D coordinates of an anchor. But since two additional parameters are also estimated (speed of sound, and signature time-offset), at least six reference points are needed. Since the coordinates of the reference points must be known precisely, in practice it can be convenient to use a calibration fixture that allows placing the tag precisely at known positions.

Let $r_x(i)$, $r_y(i)$ and $r_z(i)$ respectively represent the x, y and z coordinates of the ith reference point, for $1 \leq i \leq N$, where N is the number of reference points. Acoustic ranging between the tag and the anchors is performed by placing the tag, sequentially, at each of these points. Let $l(i,j)$ represent the lag for the maximum cross-correlation (6) corresponding to the ith anchor with the tag at the jth reference point. The coordinates of the ith anchor for $1 \leq i \leq M$, the speed of sound, and the signature signal time offset, are estimated to be the set $\{a_x(i), a_y(i), a_z(i), c, \tau_s\}$ that minimizes the error metric e(i):

$$e(i) = \sum_{j=1}^{N}\left([l(i,j) + \tau_s]^2 - \sum_{w \in \{x,y,z\}}\left[\frac{r_w(j) - a_w(i)}{c}\right]^2\right)^2 \quad (10)$$

The term $[l(i,j)+\tau_s]^2$ represents the square of the measured lag, whereas the summation over w represents the square of expected lag. Once again, as in positioning (9), the error metric can be a fourth order polynomial avoiding square-root and absolute value functions.

III. Performance Assessment

A prototype positioning system was created to test the validity of this method and to estimate its performance. In some examples, the tag can be a speaker or a microphone (with anchor points being microphones and speakers, respectively, in corresponding cases) both with similar positioning accuracy and ranging results. In one examples, the tag was chosen to be a speaker, and anchor points were chosen to be a set of microphones, for sake of convenience. This allows transmitting a signal from the tag, which is received by all of the anchor points simultaneously, thus reducing the test time compared to the alternative where each anchor point would have to transmit the signal in a multiplexed fashion.

For ranging signal, the audible part of the audio spectrum was selected for use, specifically from 5 kHz to 15 kHz, as opposed to ultrasonic spectrum. This allowed the use of easily available off-the-shelf components for the audio subsystem including speaker, microphones, amplifiers and data converters (ADC and DAC). The ranging signal (e.g., x(t)) was generated by passing a pseudo-random white-noise sequence through a bandpass filter. The lower passband edge of the bandpass filter was set at 5 kHz to be able to use small-sized tweeters, while the upper passband edge was set at 15 kHz to keep it comfortably below 20 kHz, which is the advertised bandwidth of most off-the shelf audio components. Additionally, the signal was passed through a pre-whitening filter (e.g., g(t)), as presented in (8), to ensure sharp autocorrelation peak of the signature signal (e.g., s(t)). While the performance of system definitely depends on the bandwidth of the ranging signal, it does not depend so much on its center frequency. Hence, the performance of an equivalent ultrasonic system can be at least equally good, provided the bandwidth of the ranging signal is equal to or higher than the prototype system, i.e. 10 kHz.

In some examples, the choice of the duration of the ranging signal presents a trade-off between positioning accuracy and tracking bandwidth. A longer duration results in better signal-to-noise ratio (SNR) in the cross-correlation output, which helps with accurate positioning. However, this can come at the expense of tracking bandwidth as well as, in some cases, an increased probability of the tag having moved significantly during the ranging process. Even though the tag was only moved during the gap between measurements in certain experiments, the duration of the ranging signal was kept at 0.1 s after identifying that as the point of diminishing return based on trials with various signal durations. This value was chosen to not be the limiting factor for the accuracy of the core positioning scheme and only requires the tag to remain stationary for 0.1 s for each positioning estimate.

A. Equipment Details

Figure 5:
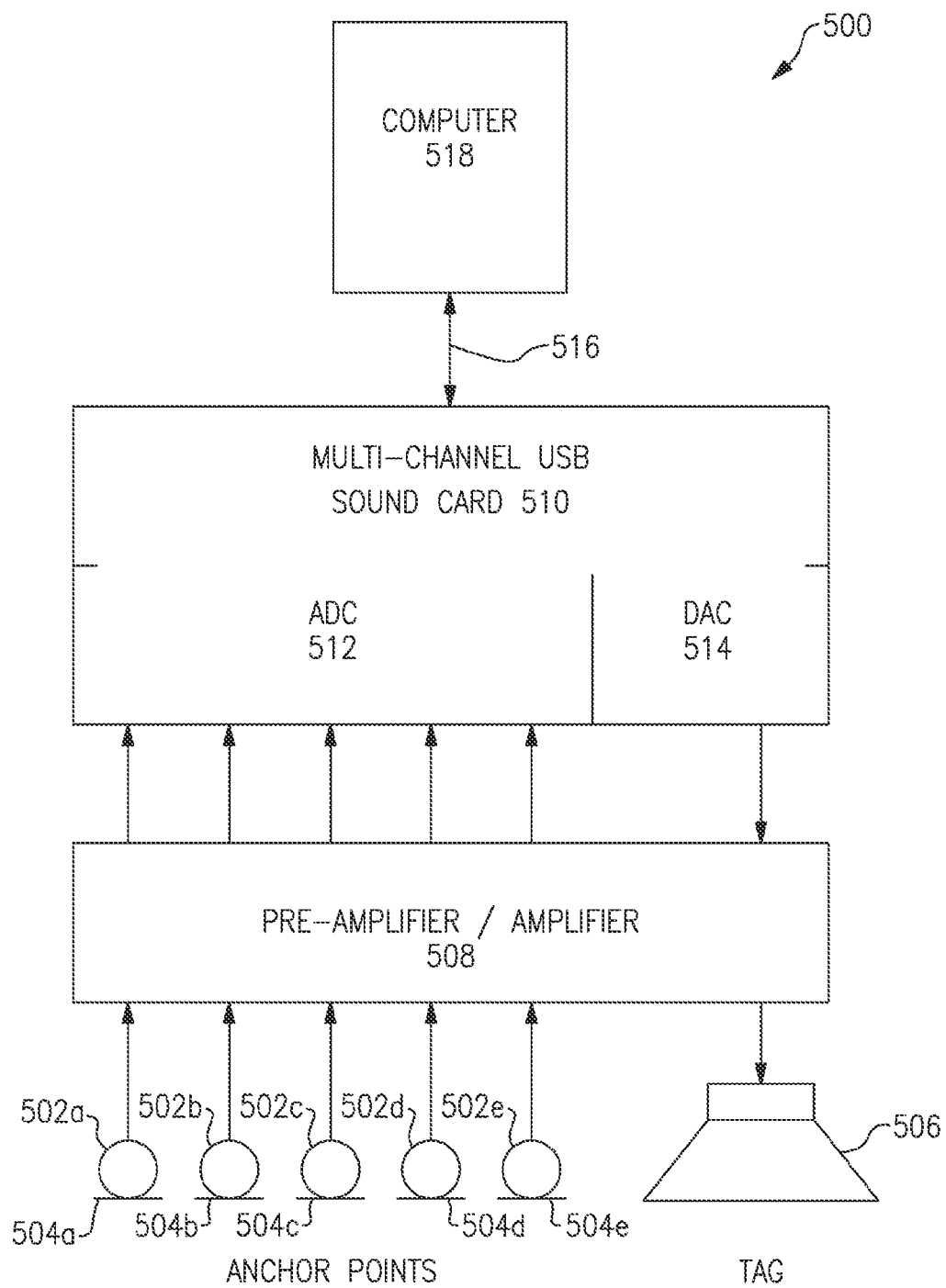
FIG. 5 is a schematic of an example prototype system.

FIG. 5 is an example audio subsystem 500. A set of five electret condenser microphones 502a-502e, rated to operate within 20 Hz to 20 kHz range [25], were used as anchor points 504a-504e. The minimum number of anchor points required to estimate the position of a tag 506 in three-dimensional space is four. An extra anchor point was used to have redundancy in the system. The microphones 502a-502e, each integrated with a dedicated pre-amplifier 508, were powered by two AA batteries. A general purpose tweeter with half-inch driver, and rated to operate within 1.3 kHz to 22 kHz range [26] was used as the speaker tag 506. A multichannel audio interface box 510 from RME Audio [27] was used for analog-to-digital conversion 512 of the microphone signals and digital-to-analog conversion 514 of the ranging signal. The audio interface was connected, via a USB cable 516, to a notebook computer 518 with Intel Core-i7 4700 CPU, which was used to perform the signal processing tasks. These tasks took, on average, 112 ms for each position. About 90% of this was solely for cross-correlation computation, which can be further optimized so that the algorithms and corresponding computations take less time. With the computational time reduced so as to be shorter than the ranging signal duration, the positioning measurements can be performed continuously in real-time.

B. Robotic Arm Reference

Figure 6:
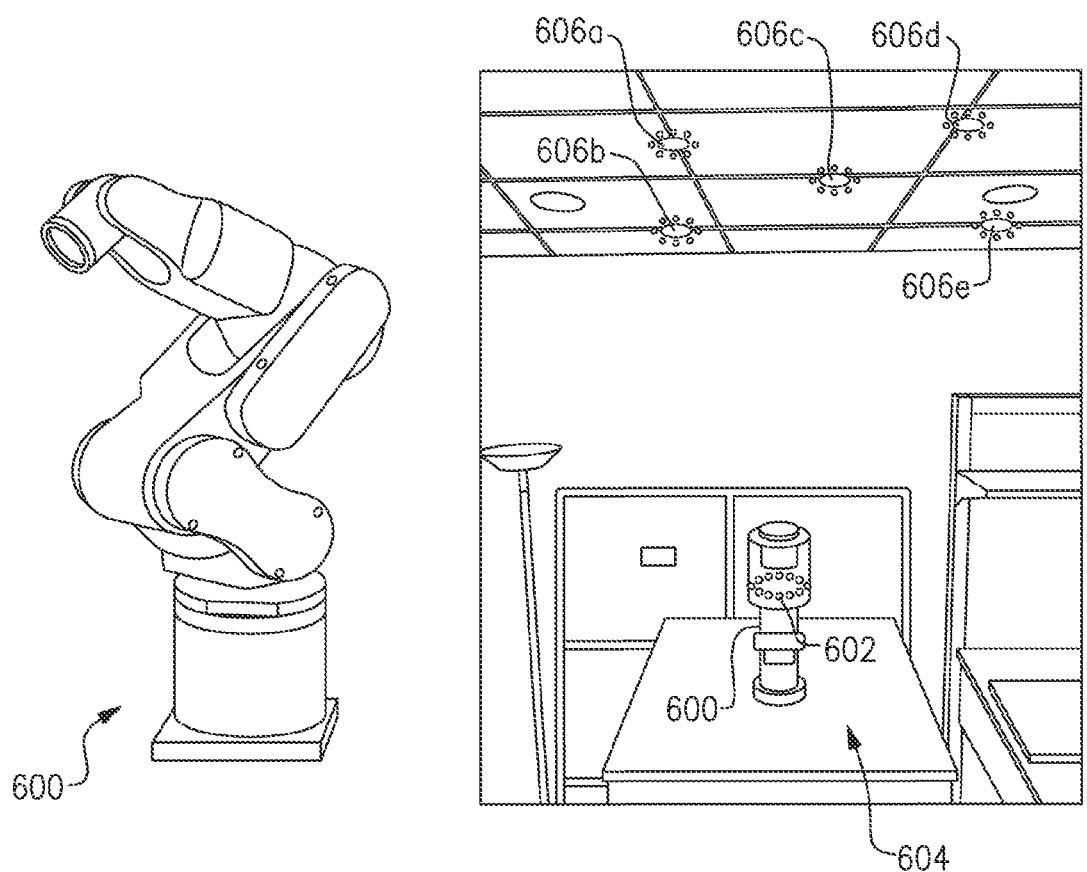
FIG. 6 is a picture (left) of a robot (Epson C3) arm used for performance assessment and a picture (right) of a test area. The tag (blue) is mounted at the end of the arm. The anchor points (green) are located on and around the ceiling.

To evaluate the performance of the positioning system, the estimated position was compared with those obtained from an industrial Epson C3 robot (Epson Robots, Carson, Calif.) arm 600 with six degrees of freedom, as shown in FIG. 6. The arm 600 is capable of movements that are rapid, precise, and repeatable. Although the arm 600 was designed for industrial assembly, it is well suited for controlled studies of movement. Optical motion capture systems are often used to measure position of reflective markers with high precision (<1 mm), but they do not provide any means of precise and repeatable control of movement. The C3 provides angular velocities of each of the six joints in the range of 450-720°/s, has a repeatability of ±0.02 mm, and has a work area of ±0.48 m×±0.48 m×±0.48 m. The tag 602 is mounted at the end of the arm 600 in the test area 604. Anchor points 606a-606e (corresponding to the anchor points 504a-504e) were located on and around the ceiling of the test area 604.

C. Anchor Localization and Positioning

Firstly the anchor points 606a-606e were localized by minimizing the error function in (10) at a set of 13 reference points. At least six reference points are needed for the minimization to not be under-constrained. However, larger sets of reference points, spread over the entire test area, were observed to decrease the final positioning error. The choice of 13 reference points marked the point of diminishing returns in terms of both the positioning accuracy and the variance of the estimator. The individual reference points were chosen randomly from the set of all test positions. With localization complete for all five anchor points 606a-606e, the positioning performance within the entire range of the robot arm 600 was tested while moving the arm 600 in increments of 50 mm in x, y, and z dimensions. This step-size was chosen to limit the total test cases to a reasonable number. This resulted in a set of 384 positions of the tag, which included 64 points in the horizontal plane, spanning an area of 0.5 m×0.5 m, with 6 vertical locations (spread over 0.25 m) at each horizontal point. The estimated position was compared to the actual position of the robot arm 600 to ascertain the performance of the system 500.

D. Performance Criteria

As the performance estimation involves comparing the estimated position of the tag to its actual known position, the Euclidean distance between the two points is a natural choice for the positioning error. Hence, mean Euclidean distance error is used as the performance metric. Mean distance error are also separately examined along the horizontal and vertical axes. The distinction is made to study the effect of the placing all the anchor points 606a-606e in the direction of the ceiling on the positioning accuracy along different directions.

E. Results

Figure 7:
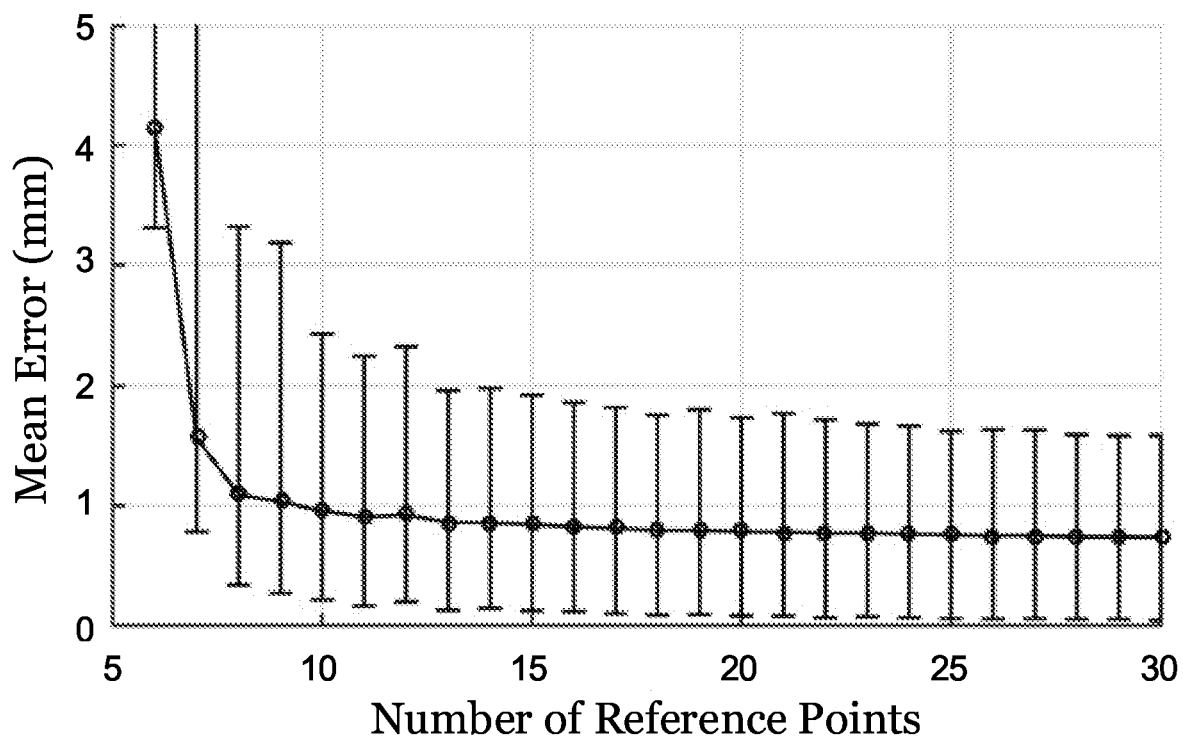
FIG. 7 is a plot of average positioning error vs number of reference locations used for anchor localization.
Figure 8:
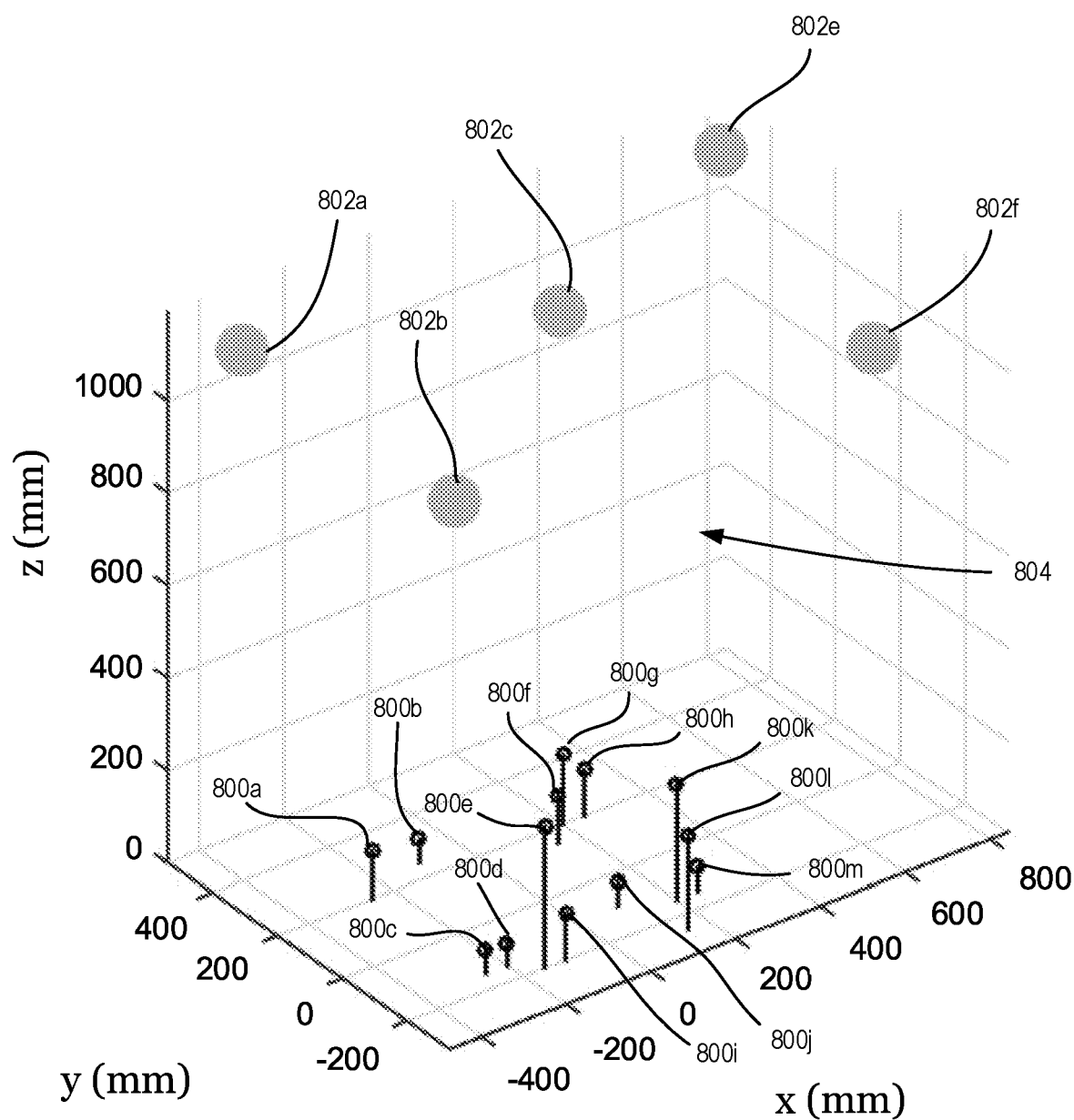
FIG. 8 is a 3-D graph depicting an example of anchor localization.
Figure 9:
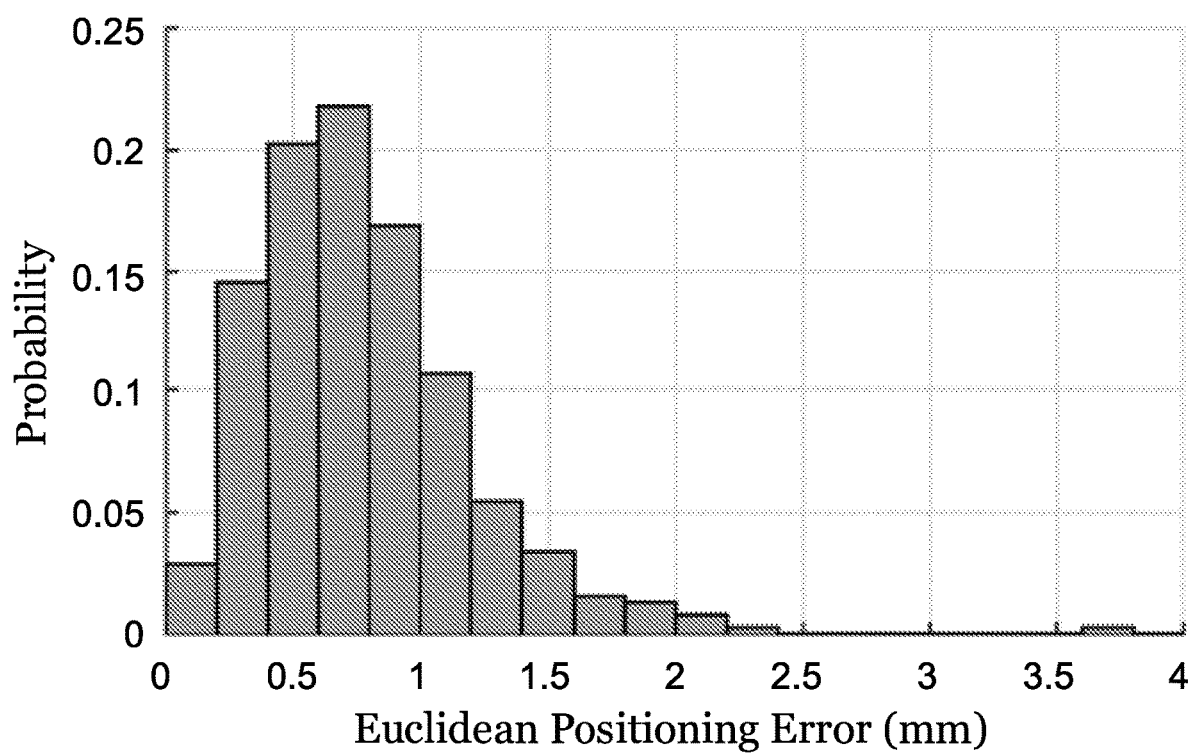
FIG. 9 is a histogram showing a distribution of positioning error.

The prototype system was used to experimentally estimate its performance in terms of average positioning error, which was defined as the average of the Euclidean distance between the actual and estimated positions over 384 test positions. The performance was found to depend significantly on the accuracy of anchor localization. The variation of the positioning accuracy with the number of reference locations is shown in FIG. 7. For each chosen number of reference points, 250 different sets of reference points were chosen (in random combinations). The average positioning error was computed for each set. The plots shows the mean (circles) along with the 95% range (bars) of the average positioning error. As expected, the average positioning error decreases with using more reference points, presumably due to better anchor localization accuracy among other factors. The high variance at small numbers of reference location highlights the fact that, in these cases, randomly selecting the reference locations sometimes results in poor anchor localization accuracy. Generally the variance gets smaller with increasing number of reference locations. In an example case shown in FIG. 8, when 13 randomly selected reference points 800a-800m were used for anchor localization of five anchor point estimates 802a-802e in a test volume 804, the average positioning error was found to be 0.77 mm. The distribution of this error, over all test positions (normalized based on 384 tests), is shown in the histogram in FIG. 9.

IV. Discussion

The prototype instrument shown in FIGS. 5-6 attained very good positioning accuracy relative to other published results. In further examples herein, the locations of the anchors (as opposed to the arbitrary placement on the ceiling) can be optimized for better triangulation of the test positions, which can improve the overall positioning accuracy [28]. In additional examples, the set of reference points can also be optimized, instead of random selection, for better anchor localization, in ways similar to satellite positioning and wireless communications [23], [29]. A calibration fixture can be used to place the tag at the optimized locations precisely and repeatably.

In representative embodiments herein, methods use one or more wideband signals for ranging. In some examples, wideband signals are broadband signals spanning a continuum of frequencies. Examples herein include ranges from Hz to kHz, kHz to multiple kHz, tens of kHz, etc., and can include ultrasonic ranges as well, such as 40 kHz or higher. This makes the system resilient to ambient acoustic noise, provides ability to reject echos, and is less sensitive to the acoustic resonances in the microphone and speakers compared to narrowband systems. The cross correlation-based methods can also be useful in system examples where multiple devices may transmit ranging signals simultaneously. Being wideband, the different ranging signals can be made orthogonal such that the cross-correlation between different signals is low. An example of this is a positioning system, where a large number of tags need to be tracked. In such a system, the anchors should use speakers and transmit the ranging signal. The tags should, using microphones, receive the signal. In this case, the various anchors could transmit orthogonal ranging signals and a tag could resolve them after cross-correlating the received signal with a set of signature signals corresponding to the set of orthogonal ranging signals.

In the prototype system example discussed above, a common clock was used for all anchor points, which may not be practical in many real systems. Hence, other examples can use different clocks. However, wireless synchronization of the anchor points is also possible using an auxiliary RF system. As seen above, the accuracy of the prototype system is around 1 mm. It takes acoustic waves around 2.9 μs to travel that distance. Compared to this, the symbol clock synchronization between a typical Bluetooth transceiver is of the order of 0.1 μs, about a tenth of the modulation symbol rate. Thus, if a similar RF device is used for wireless synchronization among the anchors, the effect on the positioning accuracy can be negligible.

Another matter of practical concern is the use of audible frequency band for the ranging signal in the prototype instrument. A "quiet" acoustic positioning instrument would typically operate in the ultrasonic band. Fortunately, the results presented here remain relevant even if ranging signal is translated into the ultrasonic band, say, around 40 kHz or higher. Higher audio frequency, in general, requires smaller transducers (microphones and speakers) and the smaller wavelength allows finer spatial resolution, both of which are advantages. Also, the positioning accuracy of the ultrasonic instrument examples can be at least as accurate as that of the prototype instrument described above.

V. Additional Examples

Figure 10:
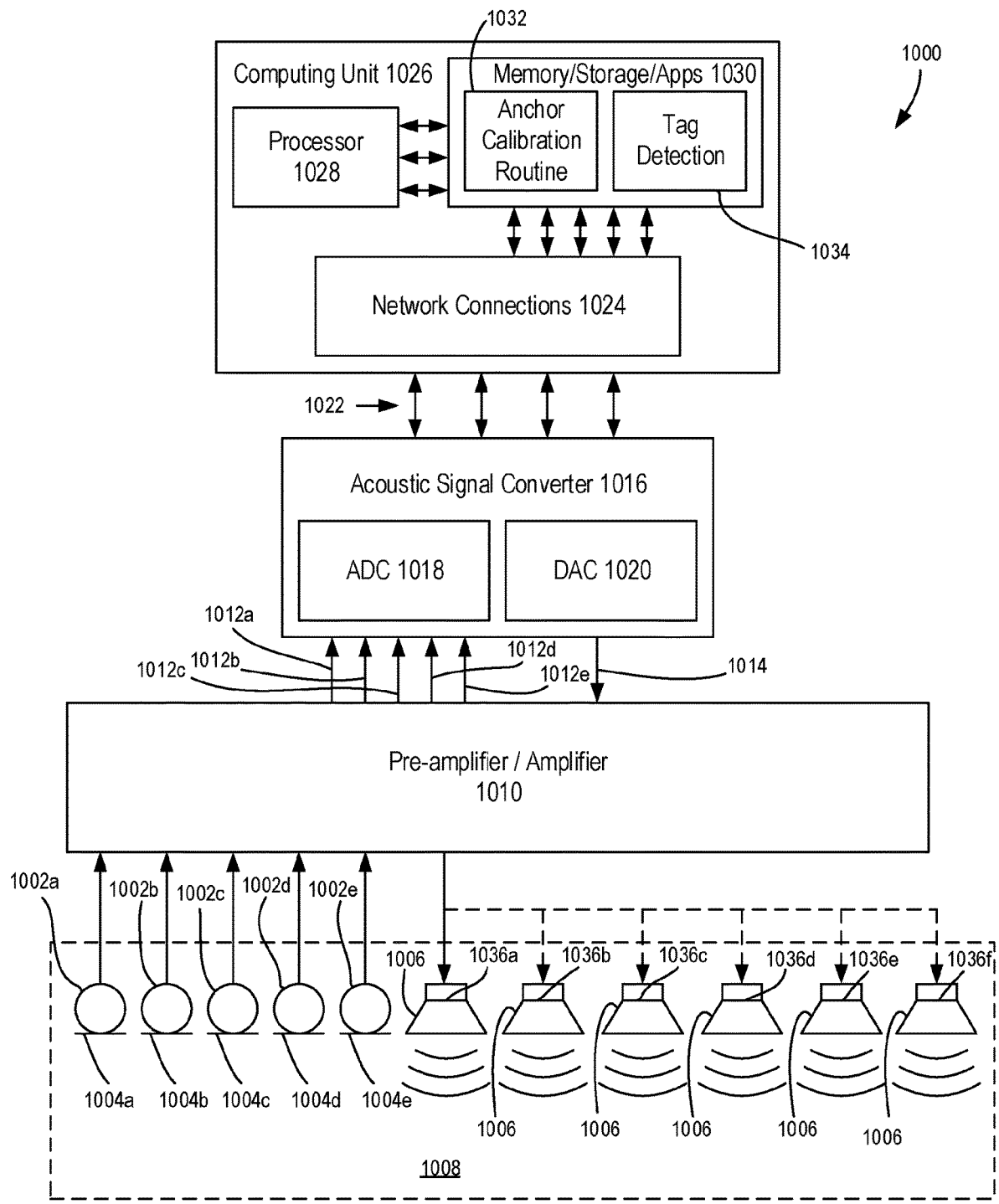
FIG. 10 is a schematic of an example ranging system for calibration and object detection.

FIG. 10 shows an example of a system 1000 that can provide acoustic anchor localization and object location/position detection through acoustic ranging. The system 1000 includes a plurality of acoustic receivers 1002a-1002e, such as transducers, microphones, transceivers, etc., coupled to respective anchor points 1004a-1004e defining reference points used in the acoustic detection of an acoustic transmitter 1006, such as a speaker, transducer, transceivers, etc., coupled to a static or moving object in a detection volume 1008. The acoustic receivers 1002a-1002e and the acoustic transmitter 1006 are coupled to a pre-amplifier/amplifier 1010 that is situated to amplify received and/or transmitted signals. Respective signal paths 1012a-1012e associated with the acoustic receivers 1002a-1002e and signal path 1014 associated with the acoustic transmitter 1006 are coupled to an acoustic signal converter 1016 that typically includes one or more analog to digital converters (ADCs) 1018 and digital to analog converters (DACs) 1020. The ADC 1018 can convert the signals received by the acoustic receivers 1002a-1002e to a digital signal that is subsequently directed through a network coupling 1022 to a network connections 1024 of a computing unit 1026. The computing unit 1026 can include a processor 1028 and a memory/storage 1030 that can include various applications or instructions, including an anchor calibration routine 1032 and a tag detection routine 1034. The memory/storage 1030 can be accessed by the processor 1028 and can execute the anchor calibration routine 1032 and tag detection routine 1034 in the form of computer-executable instructions. The memory/storage 1030 can include volatile memory, such as registers, cache, and RAM, non-volatile memory, such as ROM, EEPROM, and flash memory, or a combination, as well as removable or non-removable memory/storage including magnetic media, CD-ROMS, DVDs, or any other medium that can be used to store information in a non-transitory way and which can be accessed by computing unit 1026. A digital transmit signal is sent from the computing unit to the acoustic signal converter 1016 and converted by the DAC 1020 to an analog signal that is then reproduced acoustically by the acoustic transmitter 1006 as an acoustic transmit signal that propagates in the detection volume 1008. The acoustically transmitted signal is then detected by the acoustic receivers 1002a-1002e situated at the anchor points 1004a-1004e. It will be appreciated that in some examples, transmitter and receiver positions can be swapped.

With the anchor calibration routine 1032, unknown 3-D Euclidean position coordinates for the anchor points 1004a-1004e corresponding to respective locations in the detection volume 1008 are localized and estimated using the acoustic receivers 1002a-1002e situated at the respective points. In representative examples, the acoustic transmitter 1006 is sequentially placed at each of a plurality of calibration reference positions 1036a-1036e corresponding to respective locations in the detection volume 1008. At each of the calibration reference positions 1036a-1036f, an acoustic calibration transmit signal is produced by the acoustic transmitter 1006 that propagates through the detection volume 1008 at a local speed of sound and is received by the acoustic receivers 1002a-1002e at respective times associated with respective distances to the acoustic transmitter 1006, the local speed of sound in the detection volume 1008, and received by the computing unit 1026 after a data acquisition delay (e.g., the signature time offset discussed in examples hereinabove) that is associated with the dynamics of the system 1000, such as signal processing speeds of the computing unit 1026, acoustic signal converter 1016, latency in communication connections, and response characteristics of the acoustic receivers 1002a-1002e and/or acoustic transmitter 1006. In typical examples, the computing unit 1000, network connections 1024, acoustic receivers 1002a-1002e, and acoustic transmitter 1006 can be synchronized to a common clock.

After storing the different acoustic calibration response signals produced with the acoustic receivers 1002a-1002e at each of the calibration reference positions 1036a-1036f, the computing unit 1026 can use the anchor calibration routine 1032 to estimate the positional coordinates of the anchor points 1004a-1004e, the speed of sound in the detection volume 1008, and the data acquisition delay associated with producing the acoustic calibration transmit signal and receiving the acoustic response signal. In some examples, the calibration reference positions 1036a-1036f can be known with a suitable degree of accuracy, and the positional coordinates of the anchor points 1004a-1004e, the speed of sound, and data acquisition delay parameters can be jointly estimated by optimizing a suitable performance criterion, such as with a least squares regression minimizing the error metric of equation (9) discussed hereinabove. The joint estimation determines the positional coordinates of the anchor points 1004a-1004e based on a time of flight between the acoustic transmitter 1006 and the respective acoustic receivers 1002a-1002e. A minimum number of the calibration references positions 1036a-1036f is typically required to provide an over-determined or well-defined system solvable through nonlinear regression and minimization of an error metric (e.g., least squares). The minimum number generally corresponds to one plus the number of parameters estimated, e.g., suitable estimates for three positional parameters (x, y, z), the speed of sound, and signature time offset can be found with the six calibration reference positions 1036a-1036f.

In further examples, the calibration reference positions 1036a-1036f can have unknown positional coordinates in the detection volume 1008, and a time-difference of arrival approach can be used to estimate one or more time-difference of arrival parameters. Such approaches can allow for anchor calibration by moving the acoustic transmitter 1006 around in the detection volume 1008 as calibration pings (e.g., acoustic ranging transmit signals) are produced and detected at the anchor points 1004a-1004e. The time-difference of arrival estimation approach is based on the sending of the acoustic calibration signal from a common source (e.g., the acoustic transmitter 1006 at a selected one of the unknown calibration reference positions 1036a-1036f) and a time-difference of arrival of the acoustic transmit signal at the different acoustic receivers 1002a-1002e. In general, a difference in arrival time of the acoustic calibration transmit signal among the acoustic receivers 1002a-1002e is used to determine a distance difference in the propagation of the acoustic calibration transmit signal to the difference acoustic receivers 1002a-1002e, rather than using a time of departure of the acoustic transmit signal from the acoustic transmitter 1006. It will be appreciated that in some examples, similar time-difference of arrival approaches can be achieved with the transmit signals sent from the anchor points 1004a-1004e and received by at the calibration reference positions 1036a-1036f.

In representative examples, the positional coordinates of the anchor points 1004a-1004e, speed of sound, and data acquisition delay parameters, can be jointly estimated using time-difference of arrival and non-linear regression of an error metric. In some examples, time-difference of arrival time offsets are estimated and a time of arrival approach is used (such as examples discussed hereinabove) to estimate positional coordinates of the anchor points 1004a-1004e, speed of sound, and data acquisition delay parameters. Time difference of arrival approaches are discussed in Kuang et al., "Stratified Sensor Network Self-Calibration From TDOA Measurements," which is incorporated by reference herein and included as Appendix I, and can be used herein for time-difference of arrival determinations. It will be appreciated that time-difference of arrival approaches can also be used to estimate positions of anchor points 1004a-1004e, speed of sound, and data acquisition delay, where the positional coordinates of the calibration references positions 1036a-1036f are known. With a time-difference of arrival approach and calibration reference positions 1036a-1036f having unknown positional coordinates, additional anchor points beyond the five anchor points 1004a-1004e and/or calibration reference positions beyond the six calibration reference positions 1036a-1036f may be needed to allow the associated system of equations to be well-defined or over-determined, so as to be solvable or solvable in a sufficient timeframe.

After the system 1000 has been calibrated such that estimates for the anchor points 1004a-1004e, speed of sound, and data acquisition delay have been obtained, the tag detection routine 1034 can be used to provide a high precision estimate (e.g., less than 1 cm or less, 5 mm or less, 1 mm or less, etc.) of a position of an object in the detection volume 1008 based on acoustic ranging. In some examples, the acoustic transmitter 1006 used in calibration can be coupled to the object so that acoustic ranging calibration and acoustic ranging detection can be performed with the same acoustic transmitter 1006, and in other examples, a separate acoustic transmitter can be used in acoustic ranging detection.

Figure 11:
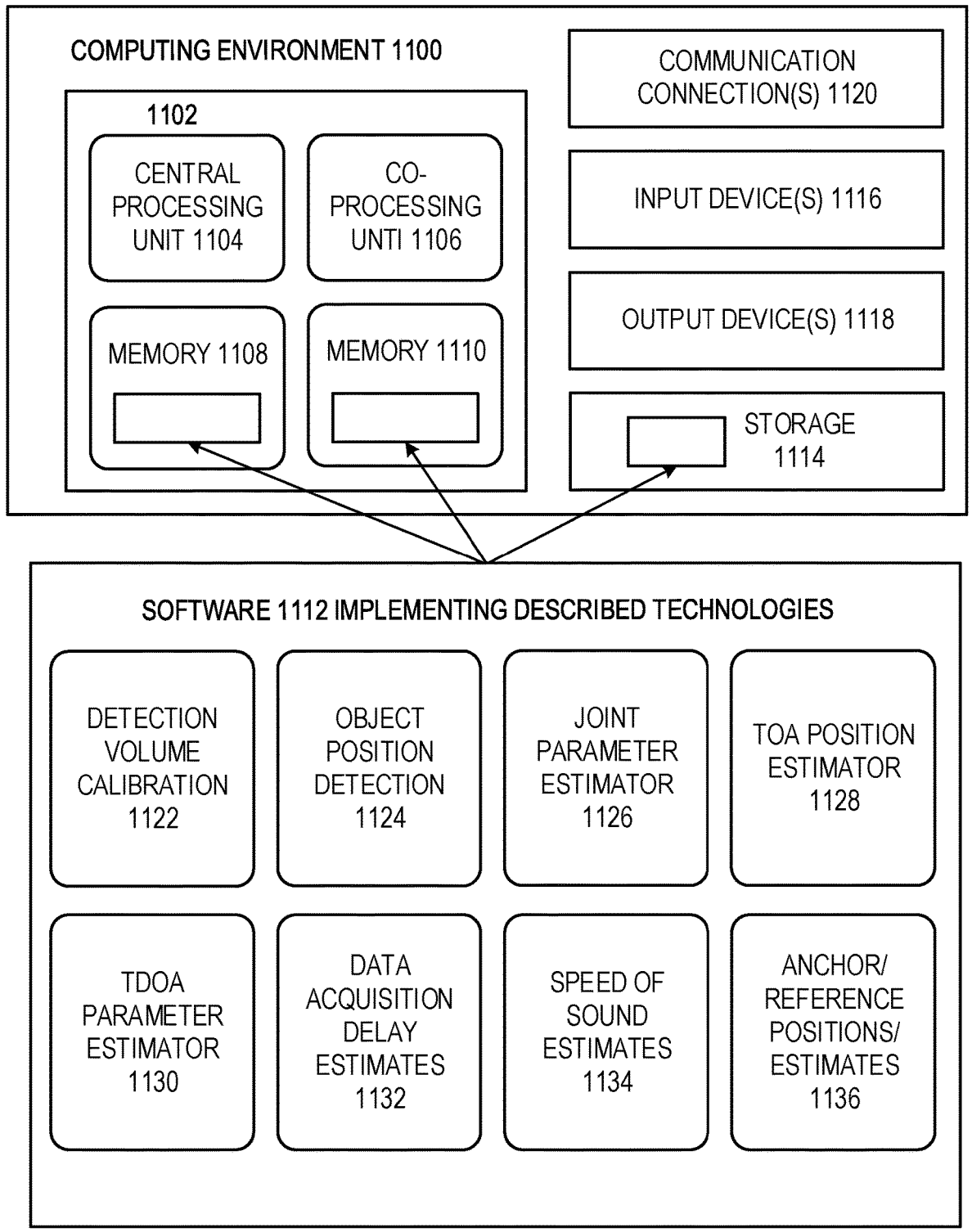
FIG. 11 is schematic of an example computing environment.

FIG. 11 is an example computing environment 1100 that can implement different method steps and algorithms described herein for acoustic ranging systems and calibration of acoustic ranging systems. The computing environment 1100 is shown in general form and is not intended to suggest a limitation on any specific use or functionality, as various examples or portions of examples herein can be implemented in general purpose or special purpose computing systems, including desktop computers, tablet computers, mobile devices, MCUs, PLCs, ASICs, FPGAs, CPLDs, etc. The computing environment 1100 includes a core grouping of computing components 1102 that includes one or more processing units 1104, 1106 and memory 1108, 1110. In some examples, processing units can be configured based on RISC or CSIC architectures, and can include one or more general purpose central processing units, application specific integrated circuits, graphics or co-processing units or other processors, such as floating point units or processors configured to enhance nonlinear regression analyses. In some examples, multiple core groupings of the computing components 1102 can be distributed among ranging system modules, and various modules of software 1112 can be implemented separately on separate ranging modules, including acoustic transmitters, acoustic receivers, for example.

The memory 1108, 1110 can be volatile memory (e.g., registers, cache, RAM), non-volatile memory (e.g., ROM, EEPROM, flash memory, etc.), or a combination of volatile and non-volatile memory. The memory 1108, 1110 is generally accessible by the processing units 1104, 1106 and can store the software 1112 in the form computer-executable instructions that can be executed by the one or more processing units 1104, 1106 coupled to the memory 1108, 1110. The computing environment 1100 can also include storage 1114, input and output devices or ports 1116, 1118, and network communication connections 1120. The storage 1114 can be removable or non-removable and include magnetic media, CD-ROMS, DVDs, flash, or any other medium that can be used to store information in a non-transitory way and which can be accessed within the computing environment 1100. In typical examples, the storage 1114 can store instructions for the software 1112 implementing one or more method steps and algorithms described herein.

Input and output devices and ports 1116, 1118 can include or be coupled to acoustic receivers, acoustic transmitters, acoustic signal converters, etc. Various interconnections can be included, such as one or more buses, controllers, routers, switches, etc., that can couple various components of the computing environment 1100 and acoustic ranging system components together, such as acoustic receivers, acoustic transmitters, acoustic signal converters, acoustic preamplifiers/amplifiers, power sources, etc. The communication connections 1120 and the input and output ports 1116, 1118 enable communication over a communication medium to various ranging system components, including other ranging system computing devices, and external system components and computing devices. The communication medium, such as electrical, optical, RF, etc., can convey information such as computer-executable instructions, acoustic transmit signals, acoustic receive signals, calibration signals, object detection signals, or other data in a modulated data signal. A modulated data signal can include signals having one or more of characteristics (e.g., frequency, amplitude, duty cycle, etc.) set or changed so as to encode information in the signal.

The software 1112 can include one or more software modules or programs, including detection volume calibration software module 1122 that can provide various commands associated with calibrating an acoustic detection volume of the acoustic ranging system, including sending and receiving acoustic calibration signals and estimating detection volume parameters. An object position detection module 1124 can be used to acoustically detect the location (including position, change of position, velocity, acceleration, etc.) of an object in the detection volume based on the estimates for the detection volume parameters provided by the detection volume calibration software module 1122. A joint parameter estimator module 1126 can be used by the detection volume calibration software module 1122 to estimate several parameters with a nonlinear regression optimization (such as least squares), including the speed of sound in the detection volume, a data acquisition delay associated with the sending, receiving, and processing of acoustic signals. The joint parameter estimator module 1126 can also be used by the object position detection module 1124 to estimate a position of an object in the detection volume based on the estimates obtained with the detection volume calibration software module 1122.

In some examples, the joint parameter estimator module 1126 can use a time of arrival position estimator 1128 that estimates the position of one or more anchor points or objects based on a time difference between a time a signal is emitted from an acoustic transmitter and is received by an acoustic receiver (e.g., from anchor points to calibration reference positions or objects, or from objects or calibration reference positions to anchor points). In further examples, the software 1112 can include a time-difference of arrival estimator 1130 that estimates the position of the anchors or object based on a time difference of arrival of an acoustic signal as received by a plurality of acoustic receivers, typically corresponding to anchor points. In estimating the position of the anchors, a plurality of well-known calibration reference positions are used as locations for transmitting (or receiving) an acoustic calibration ranging signal. The time-difference of arrival estimator 1130 can use acoustically transmitted signals transmitted from a plurality of unknown calibration reference positions (or an unknown position of an object) to estimate positions of the anchors that will be used to estimate the position of the object (or to estimate the unknown position of the object). The joint parameter estimator module 1126 can use one or both of the time of arrival and time-difference of arrival modules 1128, 1130 to jointly estimate the speed of sound in the detection volume and the characteristic delay in acquiring the different acoustic signals, together with the anchor point positions (or object position in some examples).

Estimates for data acquisition delays can be stored in a data acquisition delay estimate table 1132, and estimates for the speed of sound can be stored in a speed of sound estimate table 1134. Estimates for anchor positions can be stored in anchor/reference positions/estimates table 1136 that can also include predetermined calibration reference position values associated with time of arrival calculations. As discussed above, nonlinear regression techniques can be used to estimate values, including nonlinear least squares, though it will be appreciated that other approaches can be used as well, including state space algorithms such as the Extended Kalman Filter and particle filters, other nonlinear programming and optimization algorithms, and other error criteria such as mean absolute deviation and median absolute deviation. In representative examples herein, the various estimation techniques herein may be embodied as software or firmware instructions carried out by a digital computer or controller. In some examples, the object to be detected through acoustic ranging can include a robotic arm or other automation device that can use as a feedback signal the ranging position detection provided with the ranging estimates to control various movements of the robotic arm or automation device, such as rotations, translations, speeds, accelerations, etc.

Figure 12:
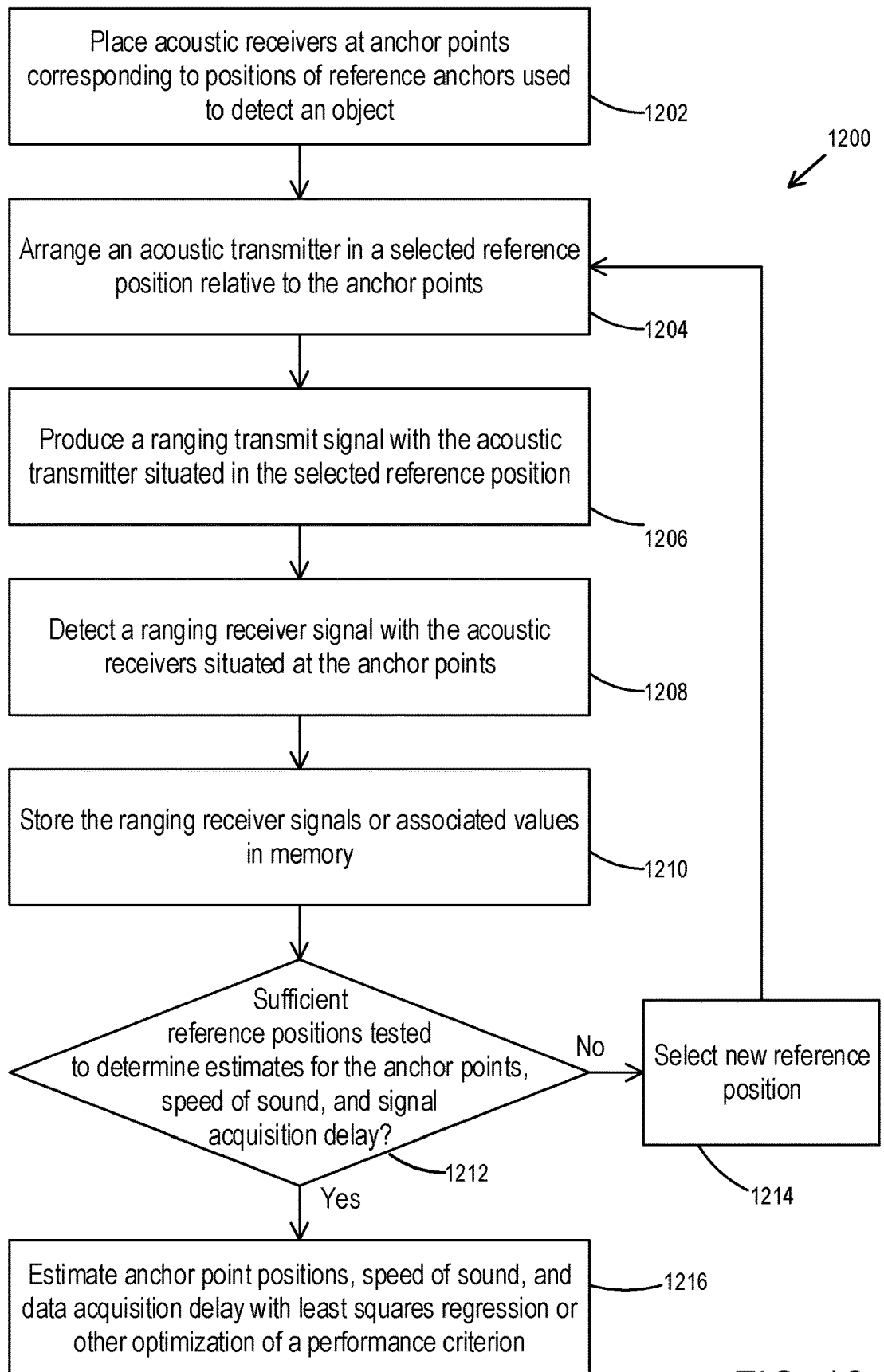
FIG. 12 is a flowchart of an example acoustic ranging calibration method.

FIG. 12 is an example method of acoustic ranging calibration 1200. At 1202, acoustic receivers are placed at selected anchor points in an acoustic ranging volume. In some examples, the anchor points can be part of an anchor fixture that can provide the anchor points in fixed positions relative to each other. The anchor points generally correspond to positions associated with the acoustic ranging volume that are used in the detection of an object position in the acoustic ranging volume. In typical examples, acoustic receivers are placed at the anchor points, though in other examples acoustic transmitters can be placed at the anchor points. At 1204, an acoustic transmitter is arranged in a selected reference position relative to the anchor points, such as with a calibration fixture having predetermined or fixed locations situated to receive the acoustic transmitter.

At 1206, a ranging transmit signal is produced with the acoustic transmitter situated at the selected reference position and propagates through the medium of the detection volume at a local speed of sound. At 1208, a ranging receiver signal (typically at various times) corresponding to the ranging transmit signal is detected at the acoustic receivers situated at the anchor points. At 1210, the detected ranging receiver signal or associated values (e.g., signal transmit and receive times, signal shape, amplitude, etc.) are stored in memory. At 1212, a check is performed to determine whether a sufficient number of reference positions have been tested such that the positions of the anchor points, a local speed of sound, and a signal acquisition delay can be estimated with a suitable degree of accuracy. In typical examples, a minimum number of reference positions to achieve accurate estimates with regression techniques corresponds to a number that does not provide the set of equations that is under-constrained. For example, six reference positions can be used to provide suitably accurate estimates for 3-D anchor point positions, the speed of sound, and data acquisition delay. Additional reference positions can be used to improve accuracy or provide a convergent solution where additional parameters associated with the detection volume are to be estimated. If additional reference positions are needed, at 1212, a new reference position becomes the selected reference position in the acoustic transmitter is placed at the newly selected reference position at 1204. In some examples, a plurality of acoustic transmitters can be placed simultaneously at all of the reference positions or at more than one reference position, e.g., with the calibration fixture. Once a suitable number of reference positions have been range detected, at 1216, the 3-D Euclidean coordinates of the anchor points, the speed sound, and the data acquisition delay can be estimated with a nonlinear regression or other optimization of a performance criterion.

Figure 13:
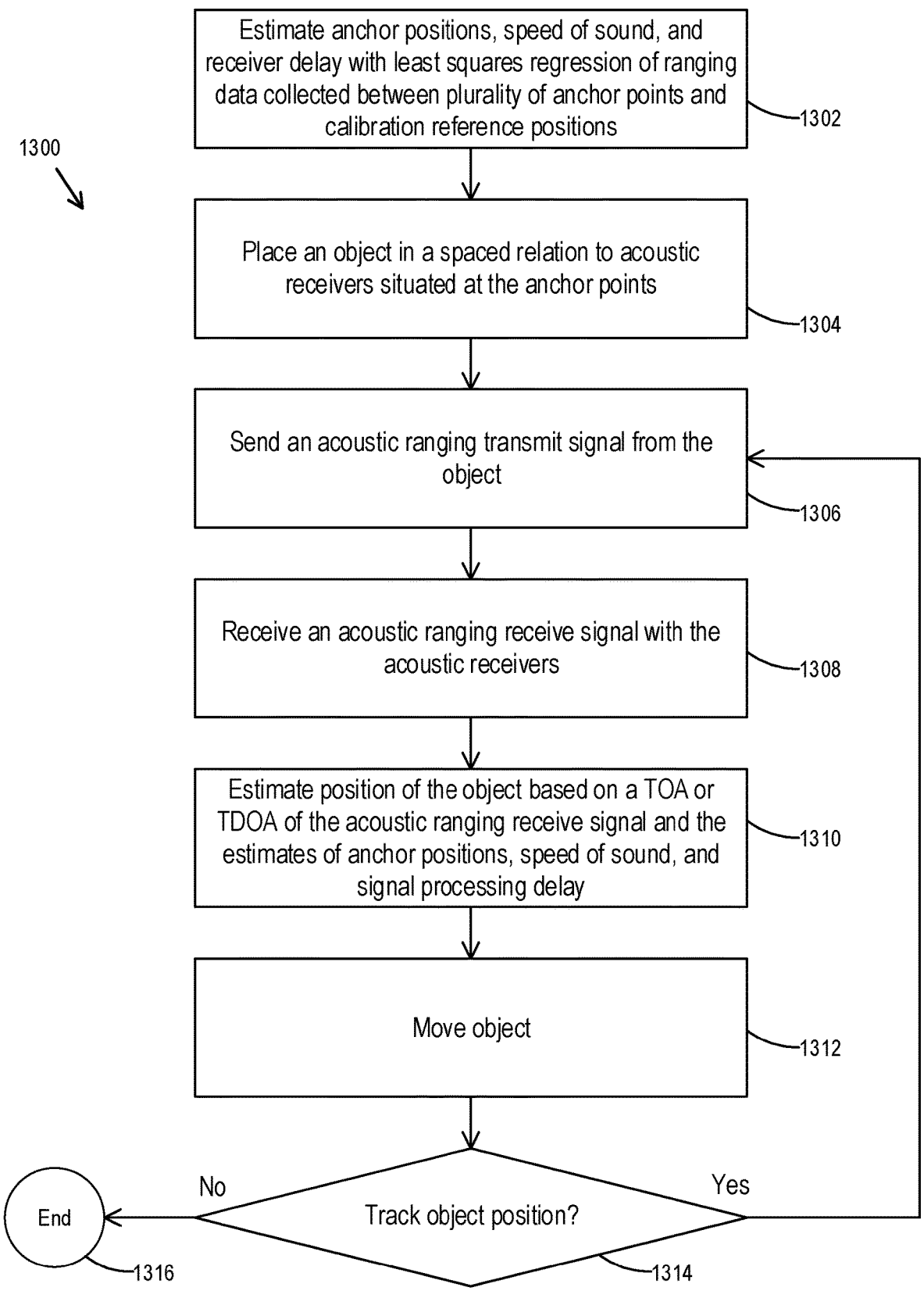
FIG. 13 is a flowchart of an example acoustic ranging position detection method.

FIG. 13 is an example method 1300 for acoustic ranging of an object in a detection volume. At 1302, estimates are obtained or accessible for anchor positions in the detection volume, a local speed of sound in the detection volume, and a data acquisition delay associated with transmitting and receiving acoustic ranging signals. The estimates are typically obtained based on a least-squares regression of ranging data that is collected between the anchor points and a plurality of known or unknown calibration reference positions. At 1304, an object that includes an acoustic transmitter is placed in the detection volume in a spaced relationship to acoustic receivers situated at the anchor points. At 1306, an acoustic ranging transmit signal is sent from the acoustic transmitter coupled to the object, and at 1308, an acoustic ranging receive signal is received at each of the acoustic receivers. At 1310, the position of the object, which corresponds to the position of the acoustic transmitter, is estimated based on a time of arrival or a time-difference of arrival of the acoustic ranging transmit signal at the different acoustic receivers, and the previous estimates for the anchor positions, speed of sound, and data acquisition delay. At 1312, the object is moved, and, at 1314, if tracking of the object is desired then an additional acoustic ranging transmit signal can be sent from the object at 1306. Alternatively, the ranging process can end at 1316.

Figure 14:
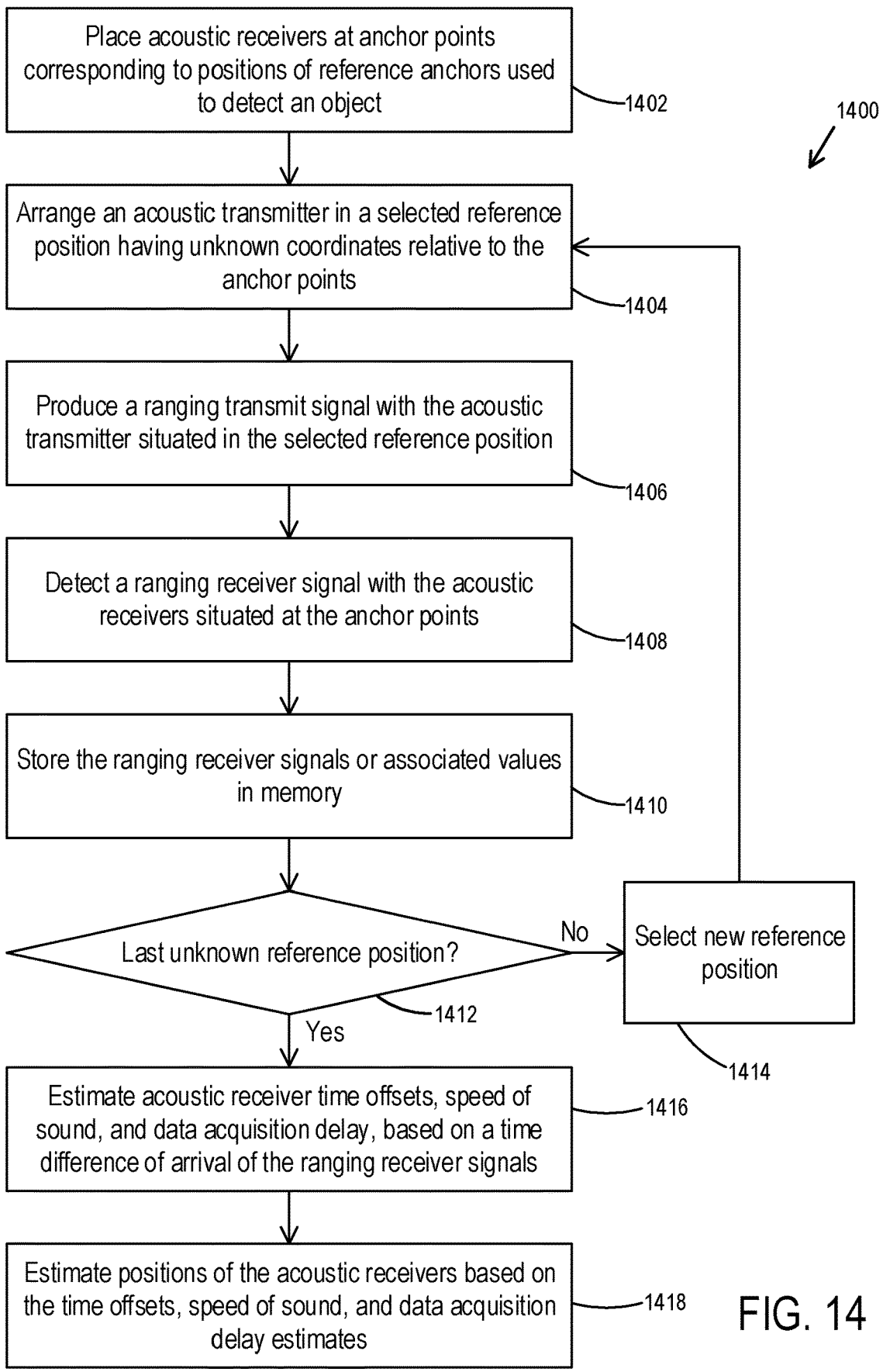
FIG. 14 is a flowchart of another example acoustic ranging calibration method.

FIG. 14 is an example method 1400 of calibrating an acoustic ranging system. At 1402, acoustic receivers are placed at anchor points that correspond to reference anchors of a detection volume of the acoustic ranging system. At 1404, an acoustic transmitter is arranged in a selected reference position of unknown spatial coordinates (typically in three dimensions) relative to the anchor points, and at 1406 a ranging transmit signal is produced with the acoustic transmitter situated in the selected reference position and that propagates through the medium of the detection volume (e.g., air). In some examples, the arranging and producing 1404, 1406 can include simple movement of the acoustic transmitter through the detection volume as the acoustic transmitter produces sounds in a period or predetermined fashion, such as by hand or wrist movement of the acoustic transmitter in a random motion for a sufficient duration. In some examples, acoustic transmitters can be situated at the anchor points, and an acoustic receiver is moved throughout the detection volume so as to correspond to reference positions for calibration. In typical examples with the acoustic receiver situated at reference positions, the acoustic receiver is stopped at selected unknown positions corresponding to the reference positions to provide a sufficient time duration for propagation of the transmitted signals from each of the acoustic transmitters situated at the respective anchor points. In some examples, anchor transmitters can emit transmit signals in a predetermined sequence, or with uniquely identifiable signal characteristics that differentiates anchor assignment.

At 1408, a ranging receiver signal is detected with the acoustic receivers situated at the anchor points, and at 1410 the ranging receiver signals or associated values are stored in memory. In typical examples, ranging calibration uses predetermined or minimum number of reference positions for estimation of detection volume parameters. At 1412, a check is performed as to whether the last reference position of the predetermined number of reference positions has been acoustically transmitted and detected, and if additional reference positions are to be used, at 1414, a new reference position is selected. At 1416, acoustic receiver time offsets, a local speed of sound, and a data acquisition delay are estimated based on a time difference of arrival of the ranging receiver signals as received by the respective acoustic receivers. At 1418, positions of the acoustic receivers (and corresponding anchor points) are estimated based on the estimates for the time offsets, speed of sound, and signature data acquisition time delays.

Figure 15:
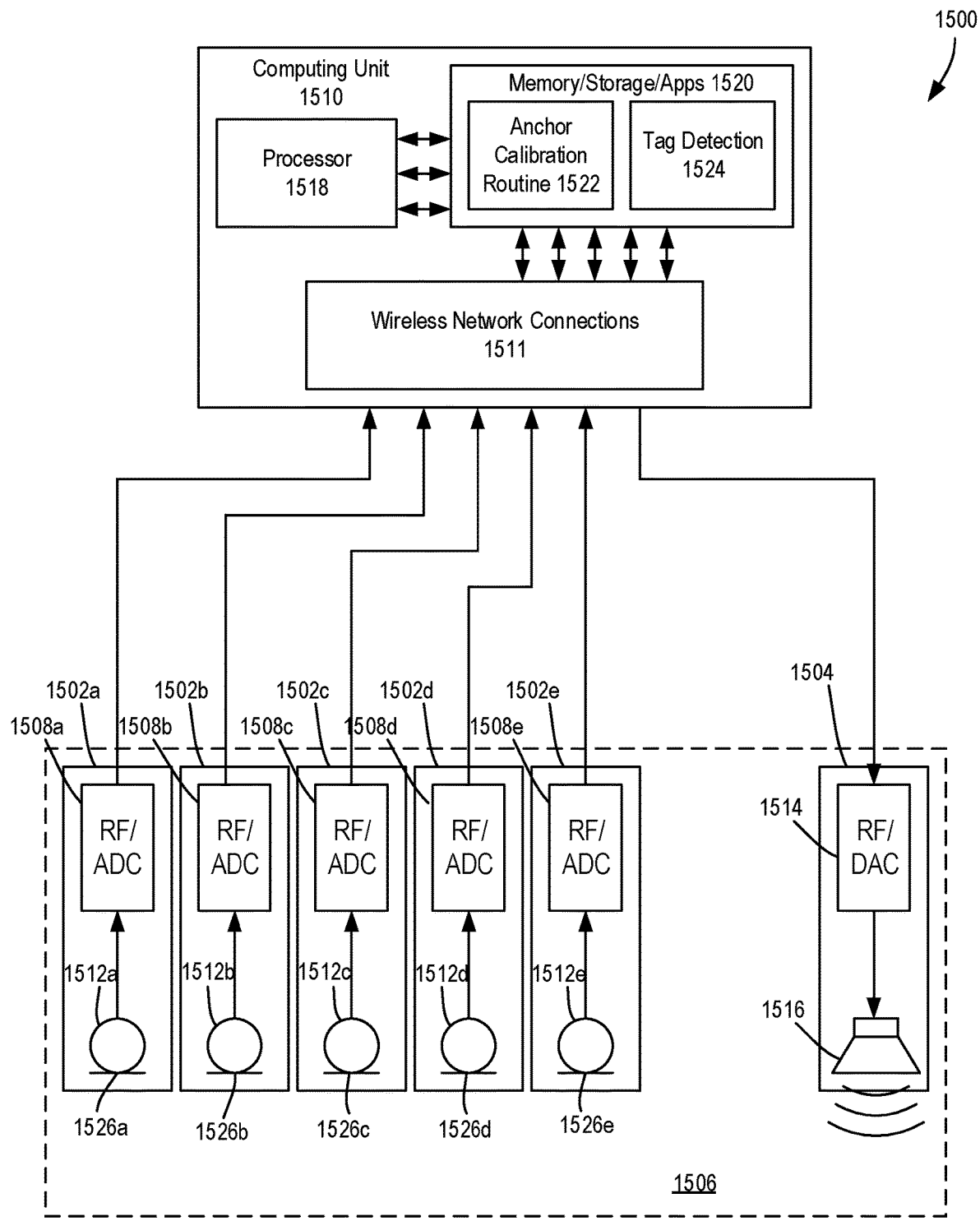
FIG. 15 is a schematic of an example ranging system with wireless acoustic transmitters and/or receivers.

FIG. 15 is an example ranging system 1500 for that can be used to localize a plurality of wireless acoustic receivers 1502a-1502e and to track movement of a wireless acoustic transmitter 1504 in a detection volume 1506 based on position and parameter estimate obtained for the localized wireless acoustic receivers 1502a-1502e. The wireless acoustic receivers 1502a-1502e include respective circuitries 1508a-1508e that include RF transmitters (or transceivers) that can provide wireless coupling to wireless network connections 1511 of an acoustic ranging computing unit 1510 or to each other (or both). The circuitries 1508a-1508e can further include analog to digital converters coupled to respective acoustic transducers 1512a-1512e that convert analog acoustic signals from the transducers 1512a-1512e into digital signals that are submitted wirelessly with the RF transmitters (e.g., through an RF communication protocol such as Bluetooth, Wi-Fi, etc.). The wireless acoustic transmitter 1504 includes a circuitry 1514 that includes an RF receiver (or transceiver) providing wireless coupling to the wireless network interface 1511 of the acoustic ranging computing unit 1510. The circuitry 1514 also includes a digital to analog converter that converts a wirelessly received digital acoustic transmit signal to an analog signal. The analog signal is directed to an acoustic transducer 1516, such as a speaker, that converts the analog signal into an acoustic transmit signal that propagates in the medium of the detection volume 1506 and that is received by the acoustic transducers 1512a-1512e. The RF transmitters and receivers of the circuitries 1508a-1508e, 1514 can be synchronized to a common clock with the wireless network interface 1511. The computing unit 1510 typically includes a processor 1518 and a memory 1518 coupled to the processor 1518 and situated to store computer readable instructions executable by the processor 1518. In typical examples, the memory 1518 includes an anchor calibration routine 1522 and a tag detection routine 1524 that can be used to localize anchor points 1526a-1526e of the wireless acoustic receivers 1502a-1502e and to detect a position of the wireless acoustic transmitter 1504 in the detection volume 1506.

VI. Conclusion

In various proposed examples herein, the feasibility of a wideband acoustic positioning instruments is demonstrated. Three challenges included ranging, anchor localization, and positioning, and each challenge was addressed. For ranging, one or more cross-correlation based techniques were used, and in representative examples the need for modeling the speaker and microphone transfer functions was avoided. In some examples, the task of initial calibration and anchor localization, which is often complicated, was handled by repurposing the same regression based technique that was used for the final positioning. This step jointly optimized the estimates for the speed of sound, the instrument delays associated with the data acquisition device, and the position of the anchors, thus eliminating the need for independent parameter estimation and enhancing the accuracy of the system. Techniques of the disclosed technology were prototyped using off-the shelf components and characterized using a state-of-the-art robotic arm, capable of extremely precise movements. Example results showed sub-millimeter level position accuracy, demonstrating the suitability of the disclosed technology herein for applications where it is highly desirable to estimate the position of an object with very high accuracy, at least within a limited range. Examples of such applications include detection of structural stress and faults, estimation of joint angles in biomechanical systems, and indoor positioning. Additional implementations of the disclosed technology can include integration with inertial sensors, integration with wearable sensors for tracking human motion, and kinematics for motion analysis applications in the entertainment and research industries.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used. In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosed technology can be defined by the following claims. We therefore claim as our disclosed technology all that comes within the scope of these claims.

REFERENCES INCORPORATED HEREIN BY REFERENCE

[1] L. Mainetti, L. Patrono, and I. Sergi, "A survey on indoor positioning systems," in *Software, Telecommunications* and *Computer Networks (SoftCOM), 2014 22nd International Conference on*, September 2014, pp. 111-120.

[2] R. Mautz, "The challenges of indoor environments and specification on some alternative positioning systems," in 2009 *6th Workshop on Positioning, Navigation and Communication*, March 2009, pp. 29-36.

[3] Y. Gu, A. Lo, and I. Niemegeers, "A survey of indoor positioning systems for wireless personal networks," *Communications Surveys Tutorials, IEEE*, vol. 11, no. 1, pp. 13-32, First 2009.

[4] R. Mautz and S. Tilch, "Survey of optical indoor positioning systems," in 2011 *International Conference on Indoor Positioning and Indoor Navigation*, September 2011, pp. 1-7.

[5] A. D. Angelis, A. Moschitta, P. Carbone, M. Calderini, S. Neri, R. Borgna, and M. Peppucci, "Design and characterization of a portable ultrasonic indoor 3-D positioning system," *IEEE Transactions on Instrumentation and Measurement*, vol. 64, no. 10, pp. 2616-2625, October 2015.

[6] M. Hazas and A. Hopper, "Broadband ultrasonic location systems for improved indoor positioning," *Mobile Computing, IEEE Transactions on*, vol. 5, no. 5, pp. 536-547, May 2006.

[7] F. J. Alvarez, T. Aguilera, J. A. Fern´andez, J. A. Moreno, and´ A. Gordillo, "Analysis of the performance of an ultrasonic local positioning system based on the emission of kasami codes," in 2010 *International Conference on Indoor Positioning and Indoor Navigation*, September 2010, pp. 1-5.

[8] M. Cobos, J. J. Perez-Solano, Belmonte, G. Ramos, and A. M. Torres, "Simultaneous ranging and self-positioning in unsynchronized wireless acoustic sensor networks," *IEEE Transactions on Signal Processing*, vol. 64, no. 22, pp. 5993-6004, November 2016.

[9] J. Tiemann, F. Eckermann, and C. Wietfeld, "ATLAS—an open-source TDOA-based ultra-wideband localization system," in 2016 *International Conference on Indoor Positioning and Indoor Navigation (IPIN)*, October 2016, pp. 1-6.

[10] A. Gaber and A. Omar, "A study of wireless indoor positioning based on joint TDOA and DOA estimation using 2-D matrix pencil algorithms and IEEE 802.11ac," *Wireless Communications, IEEE Transactions on*, vol. 14, no. 5, pp. 2440-2454, May 2015.

[11] A. Cazzorla, G. D. Angelis, A. Moschitta, M. Dionigi, F. Alimenti, and P. Carbone, "A 5.6-GHz UWB position measurement system," *IEEE Transactions on Instrumentation and Measurement*, vol. 62, no. 3, pp. 675-683, March 2013.

[12] A. D. Angelis, S. Dwivedi, and P. Hndel, "Characterization of a flexible UWB sensor for indoor localization," *IEEE Transactions on Instrumentation and Measurement*, vol. 62, no. 5, pp. 905-913, May 2013.

[13] J. D. Huang, C. K. Lee, C. S. Yeh, W. J. Wu, and C. T. Lin, "High precision ultrasonic ranging system platform based on peak-detected self-interference technique," *IEEE Transactions on Instrumentation and Measurement*, vol. 60, no. 12, pp. 3775-3780, December 2011.

[14] R. Queiros, F. C. Alegria, P. S. Girao, and A. C. Serra, "Cross-correlation and sine-fitting techniques for high-resolution ultrasonic ranging," *IEEE Transactions on Instrumentation and Measurement*, vol. 59, no. 12, pp. 3227-3236, December 2010.

[15] T. Akiyama, M. Sugimoto, and H. Hashizume, "SyncSync: Timeof-arrival based localization method using light-synchronized acoustic waves for smartphones," in 2015 *International Conference on Indoor Positioning and Indoor Navigation (IPIN)*, October 2015, pp. 1-9.

[16] N. Priyantha, H. Balakrishnan, E. Demaine, and S. Teller, "Mobile assisted localization in wireless sensor networks," in *INFOCOM* 2005. *24th Annual Joint Conference of the IEEE Computer and Communications Societies. Proceedings IEEE*, vol. 1, March 2005, pp. 172-183 vol. 1.

[17] C. Medina, J. Segura, and S. Holm, "Feasibility of ultrasound positioning based on signal strength," in *Indoor Positioning and Indoor Navigation (IPIN)*, 2012 *International Conference on*, November 2012, pp. 1-9.

[18] R. Zhang, F. Hflinger, and L. Reindl, "TDOA-based localization using interacting multiple model estimator and ultrasonic transmitter/receiver," *IEEE Transactions on Instrumentation and Measurement*, vol. 62, no. 8, pp. 2205-2214, August 2013.

[19] M. Saad, C. J. Bleakley, T. Ballal, and S. Dobson, "High-accuracy reference-free ultrasonic location estimation," *Instrumentation and Measurement, IEEE Transactions on*, vol. 61, no. 6, pp. 1561-1570, June 2012.

[20] F. Dwiyasa and M. H. Lim, "A survey of problems and approaches in wireless-based indoor positioning," in 2016 *International Conference on Indoor Positioning and Indoor Navigation (IPIN)*, October 2016, pp. 1-7.

[21] C. Knapp and G. Carter, "The generalized correlation method for estimation of time delay," *IEEE Transactions on Acoustics, Speech, and Signal Processing*, vol. 24, no. 4, pp. 320-327, August 1976.

[22] Y. Wang and W. Xiong, "Anchor-based three-dimensional localization using range measurements," in *Wireless Communications, Networking and Mobile Computing (WiCOM), 2012 8th International Conference on*, September 2012, pp. 1-5.

[23] S. P. Chepuri, G. Leus, and A. J. van der Veen, "Sparsity-exploiting anchor placement for localization in sensor networks," in *21st European Signal Processing Conference (EUSIPCO* 2013), September 2013, pp. 1-5.

[24] S. V. de Velde, P. V. Torre, and H. Steendam, "Fast and robust anchor calibration in range-based wireless localization," in *Signal Processing and Communication Systems (ICSPCS), 2013 7th International Conference on*, December 2013, pp. 1-6.

[25] Adafruit Industries, "Electret microphone amplifier—MAX4466 with adjustable gain," 2016, [Online; accessed 27 Mar. 2016]. [Online] Available: https://www.adafruit-.com/products/1063

[26] Lanzar Inc., "Lanzar—Vst—$0.5^{00}$ neodymium flush, surface or angle mount tweeters," 2016, [Online; accessed 27 Mar. 2016]. [Online] Available: http://www.lanzar.com/sku/VST/05

[27] RME Audio, "RME: Fireface UC," 2016, [Online; accessed 27 Mar. 2016]. [Online] Available: http://www.rme-audio.de/en/products/firefaceuc.php

[28] S. Monica and G. Ferrari, "UWB-based localization in large indoor scenarios: optimized placement of anchor nodes," *IEEE Transactions on Aerospace and Electronic Systems*, vol. 51, no. 2, pp. 987-999, April 2015.

[29] P. Nazemzadeh, D. Fontanelli, and D. Macii, "Optimal placement of landmarks for indoor localization using sensors with a limited range," in 2016 *International Conference on Indoor Positioning and Indoor Navigation (IPIN)*, October 2016, pp. 1-8.

Appendix I

Kuang et al., Centre for Mathematical Sciences, Lund University "Stratified Sensor Network Self-Calibration From TDOA Measurements"

This appendix contains excerpts from the above-titled paper by Yubin Kuang and Kalle Åström of the Centre for Mathematical Sciences, Lund University. Bracketed references refer to documents included at the end of this appendix. Excerpted figure numbers have been revised to correspond to figure numbers provided in the Brief Description of the Drawings hereinabove.

Kuang et al. Abstract

This paper presents a study of sensor network calibration from time-difference-of-arrival (TDOA) measurements. Such calibration arises in several applications such as calibration of (acoustic or ultrasound) microphone arrays, bluetooth arrays, and radio antenna networks. We propose a non-iterative algorithm that applies a three-step stratification process, (i) using a set of rank constraints to determine the unknown time offsets, (ii) applying factorization techniques to determine transmitters and receivers up to unknown affine transformation and (iii) determining the affine stratification using the remaining constraints. This results in novel algorithms for direct recovery of both transmitter and receiver positions using TDOA measurements, down to 6 receivers and 8 transmitters. Experiments are shown both for simulated and real data with promising results.

1. Introduction for Appendix I

Determining the sound source positions using a number of microphones at known locations and measuring the time-difference of arrival of sounds have been an important application in sound ranging and localization. Such techniques are used with microphone arrays to enable beamforming and speaker tracking. However, in most of such applications, calibrating microphone positions and time of transmission for sound sources are difficult. Self-calibration of sensor networks using TDOA measurements is a nonlinear optimization problem, for which proper initialization is essential. It has been shown e.g. in [1, 2] that poor initialization potentially gives local minima that are far off the ground truth in both synthetic and real experiments. Several previous works rely on prior knowledge or extra assumptions of locations of the sensors to initialize the problem. In [3], the distances between pairs of microphones are manually measured and multi-dimensional scaling is used to compute microphone positions. Other options include using GPS [4] to get approximate locations, or using transmitter-receiver pairs (radio or audio) that are close to each other [5, 6].

Another line of works focuses on solving the initialization without any additional assumptions. Initialization of TOA networks has been studied in [7, 8]. Initialization of TDOA networks is studied in [9], where solutions were given to non-minimal cases (e.g. 10 receivers, 5 transmitters in 3D). For 2D TDOA calibration, a recursive search algorithm is proposed in [10]. In [11], the minimal cases where all receivers lie on a line are solved for both TOA and TDOA. Though the same rank constraint as ours is explored in [12, 13], both methods are iterative and dependent on initialization.

In this paper we study the initialization network calibration problem from only TDOA measurements for general dimensions. We utilize constraints on the rank of measurement matrix and propose a non-iterative scheme for calculating the time offsets. After calibrating the TDOA measurements with the offsets, we use a two-step scheme for the subsequent TOA problem. These schemes allow for a wider class of solvable cases which are closer to minimal cases for initializing TDOA network calibration problem. This gives non-iterative algorithms for direct recovery of both transmitter and receiver positions using as few as 6 receivers using TDOA measurements. Previous state of the art method [9], required at least 10 receivers. Solving these cases is of theoretical importance. The solvers can also be used in RANSAC [14] schemes to re-move outliers in noisy data. The methods are validated both on synthetic and real data. The node localization is cross-validated against independent recordings as well as against computer vision based approaches.

2. Problem Formulation of Appendix I

Let $r_i$, $i=1, \ldots, m$ and $s_j$, $j=1, \ldots, n$ be the spatial coordinates of m transmitters and n receivers, respectively. For measured time of arrival $t_{ij}$ from transmitter ri to receiver sj, we have $v(t_{ij}-t_j)=\|r_i-s_j\|_2$, where $t_j$ is the unknown offset for each transmitter, and $v$ is the speed of measured signals (assumed to be constant). We will in the sequel work with the distance measurements ($f_{ij}=vt_{ij}$, $o_j=vt_j$). The TDOA calibration problem can then be defined as follows.

Problem 2.1 (TDOA-based Network Self-Calibration) Given relative distance measurements fij determine receiver positions $r_i$, $i=1, \ldots, m$, transmitter positions $s_j$, $j=1, \ldots, n$ and offsets $o_j$, $j=1, \ldots, n$ such that $f_{ij}=\|r_i-s_j\|_2+o_j$.

If the offsets are known or have been estimated, the conversion from TDOA to TOA problems (where the absolute distance $d_{ij}=\|r_i-s_j\|_2$ are given) are straightforward, i.e. by setting $d_{ij}=f_{ij}-o_j$. Note that for both TDOA and TOA problems, one can only reconstruct locations of receivers and transmitters up to euclidean transformation and mirroring. In the following discussion, we assume that the dimensionality K of the affine space spanned by ri and sj is the same, e.g. K=3 for 3D problems. The minimal configurations have previously been determined in

TABLE 1

Cases for TDOA problem for 3D (left) and 2D (middle). (I) minimal cases, (II) solvable cases for [9] and (III) solvable cases for our proposed method. Right: number of solutions to the polynomial systems of rank constraints on unknown offsets for different cases in (III) (3D and 2D).

| | | | n | | | | | | | n | | | | | | |
|---|---|---|---|---|---|---|---|---|---|---|---|---|---|---|---|---|
| m | 4 | 5 | 6 | 7 | 8 | 9 | m | 3 | 4 | 5 | 6 | K | m | n | $N_{sol}$ |
| 5 | — | — | — | — | — | I | 4 | — | — | I | — | 3 | 9 | 5 | 1 |
| 6 | — | — | I | — | III | — | 5 | — | — | — | III | 3 | 7 | 6 | 5 |
| 7 | — | I | III | — | — | — | 6 | I | — | — | — | 3 | 6 | 8 | 14 |
| 8 | — | — | — | — | — | — | 7 | — | III | — | — | | | | |

TABLE 1-continued

Cases for TDOA problem for 3D (left) and 2D (middle). (I) minimal cases,
(II) solvable cases for [9] and (III) solvable cases for our proposed
method. Right: number of solutions to the polynomial systems of rank constraints
on unknown offsets for different cases in (III) (3D and 2D).

|    |   |     | n |   |   |   |    |   |    | n |   |   |   |   |   |         |
|----|---|-----|---|---|---|---|----|---|----|---|---|---|---|---|---|---------|
| m  | 4 | 5   | 6 | 7 | 8 | 9 | m  | 3 | 4  | 5 | 6 | K | m | n | $N_{sol}$ |
| 9  | — | III | — | — | — | — | 8  | — | II | — | — | 2 | 7 | 4 | 1 |
| 10 | I | II  | — | — | — | — | 9  | — | —  | — | — | 2 | 5 | 6 | 5 |

3. Methods of Appendix I

To solve the TDOA calibration problem, we use a stratified approach to solve first for the offsets $\{o_j\}$ (Section 3.1), and then solve the TOA calibration problem (Section 3.2).

3.1. Estimating the Offsets

In this section we present two new techniques for solving the unknown offsets. The first scheme is an improved version of the linear factorization in [9]. Another one is to make full use of the rank constraints on the measurement matrix.

3.1.1. Linear Method

We know that $d_{ij}^2 = (f_{ij}-o_j)^2 = (r_i-s_j)^T(r_i-s_j) = r_i^T r_i - 2r_i^T s_j + s_j^T s_j$. By constructing the vectors $\tilde{R}_i = [1 \ r_i^T \ r_i^T r_i]^T$ and $\tilde{S}_j = [s_j^T s_j - o_j^2 \ -2s_j^T \ 1]^T$, we obtain $f_{ij}^2 - 2f_{ij}o_j = \tilde{R}_i^T \tilde{S}_j$. By collecting $\tilde{R}_i$ and $\tilde{S}_j$ into matrix R ((K+2)×m) and S ((K+2)×n), we have $F = R^T S$, where F is the m×n matrix containing $\{f_{ij}^2 - 2f_{ij}o_j\}$. This suggests that matrix F is at most of rank K+2 as we increase m and n. A slight modification to scheme in [9] can reduce the required number of receivers by 1. The idea is to exploit the structure of S—ones in the last row, by multiplying F from the right by a n×(n−1) matrix $C_n$ of the form $[-1_{n-1} \ I_{n-1}]^T$ where $1_{n-1}$ is a (n−1)×1 vector with 1 as entries and $I_{n-1}$ is identity matrix of size (n−1). This operation subtracts from each column j (j≥2) of S the first column and gives a matrix with all zeros at the last row. Equivalently, this gives $\bar{F} = FC_n = \bar{R}^T \bar{S}$, where $\bar{F}$ is a m×(n−1) matrix with entries $\bar{f}_{ij} = f_{i,j+1}^2 - f_{i1}^2 - 2f_{i,j+1}o_{j+1} + 2f_{i1}o_1$, $\bar{R}_i = [1 \ r_i^T]^T$ and $\bar{S}_j = [s_{j+1}^T s_{j+1} - o_{j+1}^2 - (s_1^T s_1 - o_1^2) - 2(s_{j+1} - s_1)^T]T^T$. This effectively gives a constraint that the matrix $\bar{F}$ is at most of rank K+1. Let $A = \{f_{ij}^2 - f_{i1}^2\}_{j\geq 2}$, $B = \{-2f_{ij}\}_{j\geq 2}$, $c = \{2f_{i1}\}_{i\geq 1}$ e is a (n−1)×1 vector $[o_1, \ldots, o_1]^T$, T is the diagonal matrix with $\{o_j\}_{j\geq 2}$ as entries. We have $$\bar{F} = \bar{R}^T \bar{S} = [A \ B \ c] \begin{bmatrix} I_{n-1} \\ T \\ e^T \end{bmatrix}. \quad (1)$$

Given the first column of $\bar{R}^T$ are all ones, there exist (K+1) columns of $\bar{F}$ whose linear combination forms a column of ones. If we choose m=2K+3 ([A B c] is of full rank) and n=K+2 ($\bar{F}$ is of rank K+1), we can find a unique solution for u to the following system:

$$\bar{F} = [A \ B \ c] \underbrace{\begin{bmatrix} I_{n-1} \\ T \\ e^T \end{bmatrix} w}_{u} = [A \ B \ c] \ u = \mathbb{1}_{2K+3}. \quad (2)$$

Then we can recover the offsets $\{o_j\}$ as $$o_1 = \frac{u_{2K+3}}{\sum_{j=1}^{K+1} u_j} \quad \text{and} \quad o_j = \frac{u_{j+K}}{u_{j-1}}$$

for j=2, ..., K+2. For cases in 3D (K=3), we need only 9 receivers and 5 transmitters.

3.1.2. Non-Linear Rank Constraints

We further utilize the similar structure in R. By multiplying $\bar{F}$ from the left with $C_m = [-1_{m-1} \ I_{m-1}]^T$, this gives correspondingly $\tilde{F} = C_m^T \bar{F} C_n = \tilde{R}^T \tilde{S}$. Here $\tilde{R} = RC_m$ and $\tilde{S} = SC_n$ and $\tilde{F}$ is of size (m−1)×(n−1). Given that the first row of $\tilde{R}$ and the last row of $\tilde{S}$ are all zeros, the equality $\tilde{F} = \tilde{R}^T \tilde{S}$ is preserved after removing the last row of $\tilde{R}$ and the first row of $\tilde{S}$. We then have $\tilde{R}_i = [(r_{i+1} - r_1)^T]$, $\tilde{S}_j = [-2(s_{j+1} - s_1)^T]$ and $\tilde{F} = \tilde{R}^T \tilde{S} = \{\tilde{f}_{ij}\}$ with $\tilde{f}_{ij} = g_{ij} - g_{0j} - g_{i0} + g_{00}$, where $g_{ij} = f_{i+1,j+1}^2 - 2f_{i+1,j+1}o_{j+1}$. It is clear that the matrix $\tilde{F}$ is at most of rank K. Therefore, given that each entry of $\tilde{F}$ is a function of the unknown offsets $\{o_1, \ldots, o_n\}$, we can solve for the offsets by enforcing these rank constraints on the sub-matrices of $\tilde{F}$. Specifically, all (K+1)×(K+1) sub-matrices of $\tilde{F}$ (if there exist) will be rank-deficient and have rank K. This gives equivalently constraints on the determinants of the set (K+1)×(K+1) sub-matrices $\Lambda_{K+1}$: detQ=0, $\forall Q \in \Lambda_{K+1}$.

For a (m−1)×(n−1) matrix $\tilde{F}$ of rank K, the number of constraints $$N_c = |\Lambda_{K+1}| = \binom{m-1}{K+1}\binom{n-1}{K+1}$$

among which (m−1−K)(n−1−K) constraints are linearly independent. Each constraint is a polynomial equation of degree K+1 in $\{o_1, \ldots, o_n\}$. For different choices of m and n, this system of polynomials equations can either be well-defined, over-determined or under-determined. To resolve this, we rely on algebraic geometry tools and make use of Macaulay2 [15]. It turns out that there are several choices for m and n that produce well-defined and solvable polynomial systems. We summarize those cases and the number of solutions of the related polynomial systems for K=3 and K=2 in Table 1. In the following discussion, we denote the case with m receivers and n transmitters as mr/ns. Note that the two cases with only 1 solution: 9r/5s in 3D and 7r/4s in 2D correspond to the linearly solvable cases discussed in Section 3.1.1. Given these solvable cases, we can apply numerically stable polynomial solvers based on methods described in [16] to solve for the unknown offsets.

One could say that we are using necessary constraints on the corrected matrix D with entries $d_{ij}^2 = (f_{ij} - o_j)^2$ to determine the offsets. Notice, however, this constraint is a necessary, but not sufficient condition on D coming from TOA measurements. For instance, although 7r/6s is a minimal case for determining the offsets from the rank $(C_m^T D C_n) = 3$, the resulting TOA problem is actually over-determined [8].

3.2. Solving TOA Calibration

Once we have calibrated the measurement matrix with the offsets $\{o_j\}$ estimated as in Section 3.1, we can proceed to solve the locations of $\{r_i\}$ and $\{s_j\}$ as a TOA problem. We follow the two-step technique in [8] that reduce the TOA problem to solving a system of polynomials with N=K+(K+

1)K/2 unknowns e.g. for K=3, N=9. Due to the limited space here, we here briefly discuss the related modification and we refer to [8] for more technical details. Specifically, after a factorization step using singular value decomposition (requiring m≥4 and n≥4), for m receivers and n transmitters, one obtains m−1 linear equations and n polynomial equations. Then the linear equations are utilized to reduce the number of unknowns further. There are two minimal configurations i.e. m=6, n=4 (equivalently m=4, n=6) and m=5, n=5, which are difficult to solve. For all our solvable cases for unknown offsets in 3D, we can actually utilize the extra measurements to form as many linear equations as possible. For instances, for the case 9r/5s, one can eliminate 8 out of the 9 unknowns utilizing the 8 linear equations. Then we can solve for the only remaining unknown with one of non-linear equations (among the 5) with companion matrix. For other cases, we just need to solve corresponding polynomial systems which are much easier to solve than the minimal cases.

3.3. Solving TDOA Self-Calibration

We can combine the steps for unknown offsets and the TOA problem to solve the full TDOA problem. To this end, we have devised a set of close-to-minimal solvers for both 3D and 2D TDOA self-calibration problem. We discuss here schemes for solving the problem with over-determined measurements. We can apply similar strategy as incremental structure from motion in computer vision. One starts by choosing m* receivers that have largest number of correspondences from n* transmitters and solves for the offsets. Then the offsets of remaining transmitters can then be solved incrementally with least square followed by also a non-linear optimization to re-fine the solution. We can then recovered the positions of the chosen receivers and transmitters. The positions of remaining receivers and transmitters are calculated by trilateration e.g. [17]. In the presence of outliers, our proposed solvers can be utilized for robust fitting technique e.g. RANSAC.

The parameters obtained can then be used as initial estimates to local optimization of the non-linear least squares $\min_{r_i, s_j, o_j} \Sigma_{ij} (\hat{t}_{ij} - (\|r_i - s_j\|_2 + o_j))^2$ using standard techniques (Levenberg-Marquart) in order to obtain the maximal likelihood estimate of the parameters.

4. Experiments for Appendix I 4.1 Synthetic Data

Figure 16:
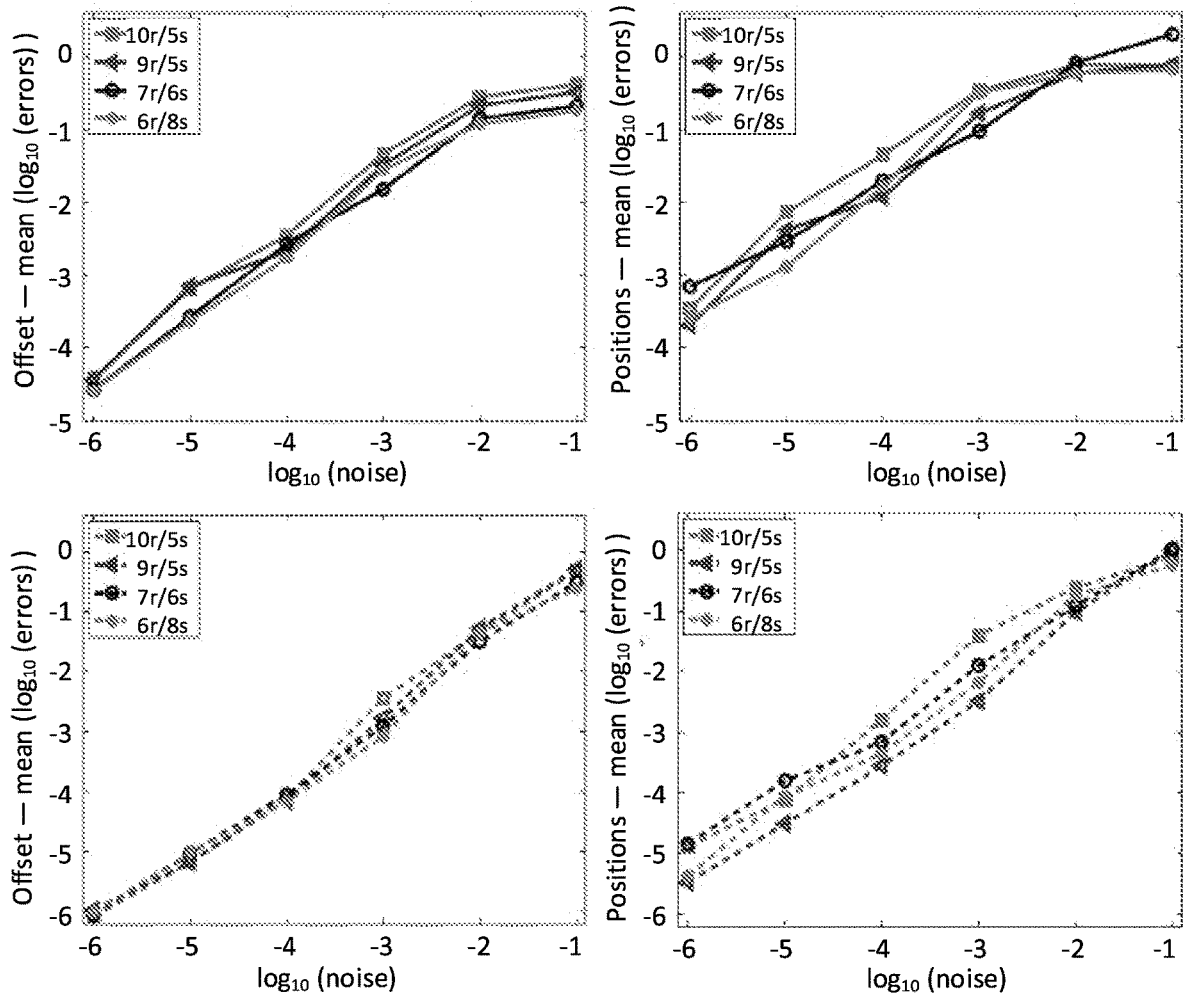
FIG. 16 is an excerpted set of graphs showing synthetic experiments for TDOA solvers on 3D under Gaussian noise, with errors of estimated time offsets shown on the left and reconstructed positions of microphones and sounds shown on the right, and with performance of different solvers (10r/5s [9], 9r/5s, 7r/6s and 6r/8s) with their corresponding minimal settings for solving offsets shown on top, and with 20 receivers and 20 microphones shown on the bottom.
Figure 17:
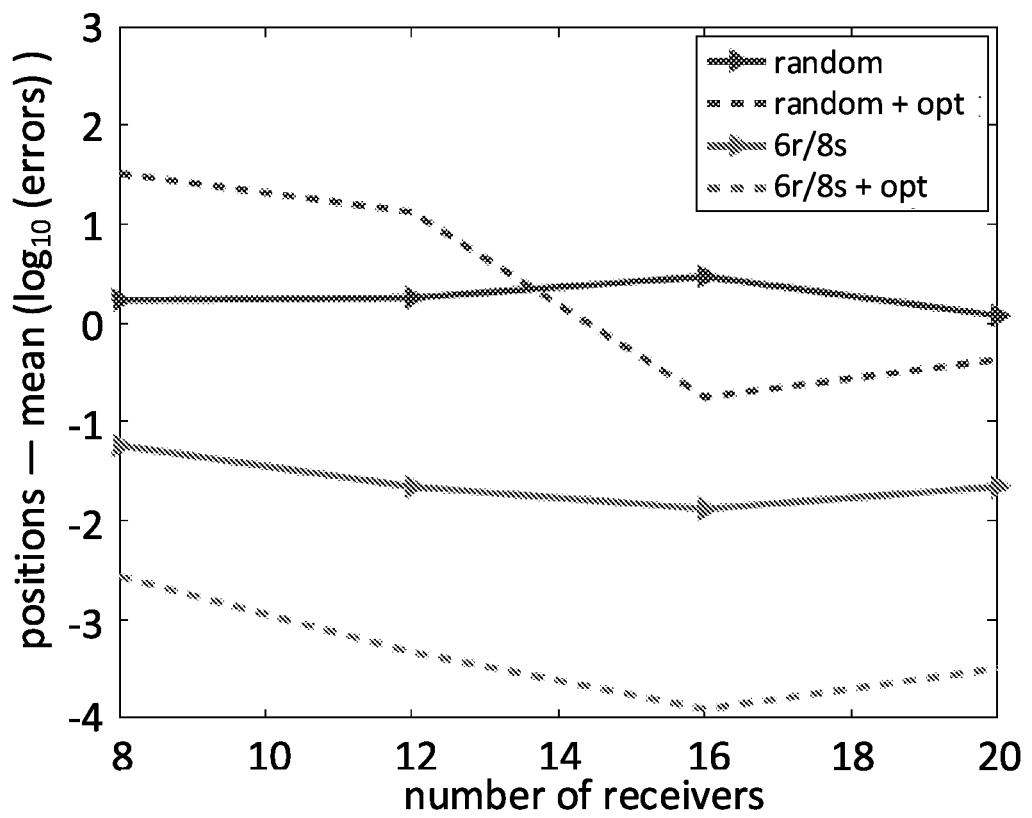
FIG. 17 is an excerpted graph showing initialization with random offsets and our 6r/8s solver with varying number receivers (8 to 20) and 8 transmitters (noise level 10-4) for non-linear optimization.

In this section, we study the numerical behaviors of the TDOA solvers on synthetic data. We simulate the positions of microphones and sounds as 3D points with independent Gaussian distribution of zero mean and identity covariance matrix. As for the offsets, we choose them from independent Gaussian distribution with zero mean and standard deviation 10. We study the effects of zero-mean Gaussian noise on the solvers, where we vary the standard deviation of the Gaussian noise added to the TDOA measurements. When solving TOA problem, we have used the scheme discussed in Section 3.2 for over-determined cases. To compare the reconstructed positions of microphones and sounds with the true positions, we rotate and translate the coordinate system accordingly. We can see that from FIG. 16, our proposed solvers 9r/5s, 7r/6s and 6r/8s give numerically similar results as the 10r/5s case in [9] for both minimal settings and over-determined cases. In FIG. 17, random initialization of the time offsets resulted in poor convergence in the non-linear optimization, while our method provides with a much better starting point. On the other hand, we have also compared our solver with the iterative method proposed in [12] for estimating the offsets. The method in [12] converges very slowly (5 sec.-1 min. on a MacBook Air with i5 1.8 GHz core, especially for (near) minimal settings) and tends to converge to the wrong local minima. While our solvers perform consistently well for all cases, they are also much faster (approximately 0.5s for the unoptimized codes). This suggests the usability of our pro-posed solvers in RANSAC as well as for practical settings with limited availability of the receivers.

4.2. Real Data

To collect real TDOA data, we work with sound signals and microphones. We placed 8 synchronized microphones (Shure SV100) recorded at 44.1 kHz in an office. They are approximately 0.3-1.5 meters away from each other in a non-planar fashion. We connected them to an audio interface (M-Audio Fast Track Ultra 8R), which is connected to a computer. We generated sounds by moving around in the room and clapping approximately 1-2 meters from the microphones. We collected 5 independent recordings of approximately 20 s. Each recording contained roughly 30 claps (transmitters).

Figure 18:
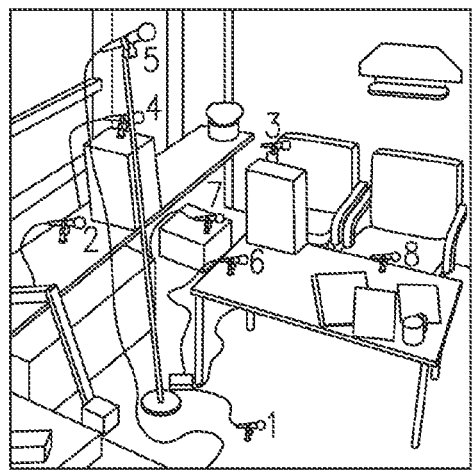
FIG. 18 is an excerpted image and set of two 3D graphs showing results for TDOA with microphones and sounds with the lower left 3D graph showing a reconstruction of microphone (8, red—'∘') and sound (21, blue—'◇') positions for one the 5 recordings, and the lower right 3D graph showing reconstructed microphone positions estimated from 5 different tracks of TDOA measurements and the corresponding reconstruction from computer vision (black—'+').
Figure 18:
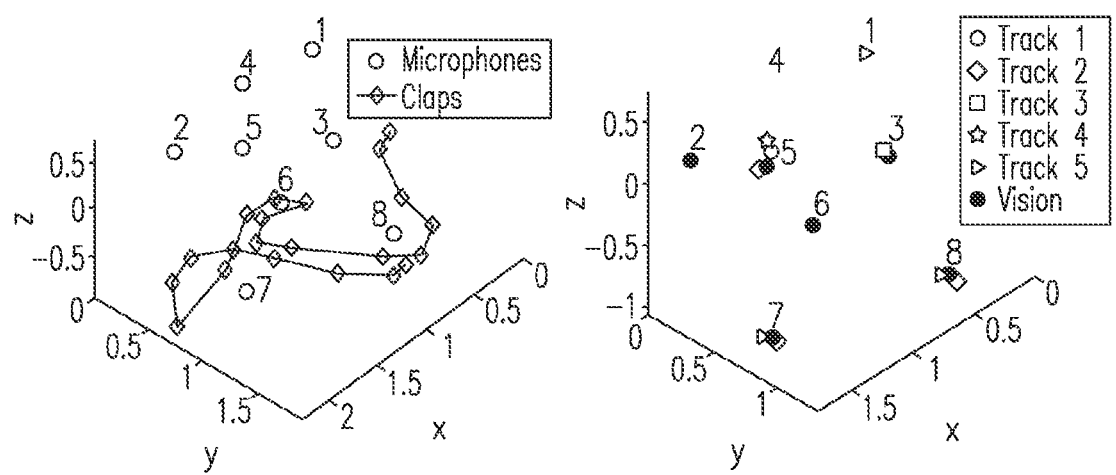

To obtain TDOA measurements, we coarsely matched sounds of the claps to sound flanks (edges between periods with low energy and periods with high energy) recorded from different microphones. For the experiment we used only those claps that were detected in all 8 channels. We run both the 7r/6s and 6r/8s solvers to determine the offsets followed by an alternating optimization that refines the offset estimation. After solving the unknown transformation and translation, we recover an initial euclidean reconstruction for the locations of microphones and claps. Finally we refine the reconstruction with non-linear optimization. The result of one of these 5 reconstructions are shown in FIG. 18 (lower left). The reconstructed microphone positions from these 5 independent multi-channel recordings were put in a common coordinate system and compared to each other. The average distance from each microphone to the its corresponding mean position (estimated from corresponding reconstruction of the 5 recordings) is 2.60 cm. It is important to point out that without proper initialization using our methods, the solutions we get converge poorly (with large reconstruction errors). Previous solvers do not work here due to either insufficient number of receivers (10 receivers needed in [9]) or violating the assumption that one of the microphones collocates with one of the claps [6].

As an additional evaluation, we have also reconstructed the locations of the microphones based on computer vision techniques. We took 11 images of the experimental setup. FIG. 18 (top) shows one of the 11 images used. We manually detected the 8 microphone center positions in these 11 images and used standard structure from motion algorithms to estimate the positions of the 8 microphones. The resulting reconstruction is also compared to that of the five structure from sound reconstructions. The comparison is shown in FIG. 18 (lower right). We can see the TDOA-based reconstructions are consistent with the vision-based reconstruction.

5. Conclusions for Appendix I

In this paper we have studied the sensor network calibration problem in the time-difference-of-arrival (TDOA) setting, where only relative distances between the transmitters and receivers are given. We have formulated the problems utilizing stricter non-linear constraints on the measurements, which is the key to reduce the required number of measurements to solve these problems. We have shown that our non-iterative solvers are fast and numerically stable (Codes are available at http://www2.maths.lth.se/vision/downloads/).

There are several interesting avenues of future research. Although, the presented technique improve on the state-of-the-art, the minimal cases for TDOA structure from sound have not been solved. It would be interesting to solve these cases, to study the failure modes, both generic failure modes (or critical configurations) for the generic problem, and also if there are additional failure modes of the presented algorithms. One commonly encountered critical configuration is when the transmitters or receivers span a lower dimensional space, e.g. if the receivers or transmitters are all on a plane or on a line.

6. References for Appendix I

[1] S. Thrun, "Affine structure from sound," in *In Proc. of NIPS*, 2005.
[2] N. Ono, H. Kohno, N. Ito, and S. Sagayama, "Blind alignment of asynchronously recorded signals for distributed microphone array," in *WASPAA '09*.
[3] S. T. Birchfield and A. Subramanya, "Microphone array position calibration by basis-point classical multidimensional scaling," *IEEE transactions on Speech and Audio Processing*, vol. 13, no. 5, 2005.
[4] D. Niculescu and B. Nath, "Ad hoc positioning system (aps)," in *GLOBECOM*-01, 2001.
[5] V. C. Raykar, I. V. Kozintsev, and R. Lienhart, "Position calibration of microphones and loudspeakers in distributed computing platforms," *IEEE transactions on Speech and Audio Processing*, vol. 13, no. 1, 2005.
[6] M. Crocco, A. Del Bue, and V. Murino, "A bilinear approach to the position self-calibration of multiple sensors," *Trans. Sig. Proc.*, vol. 60, no. 2, pp. 660-673, February 2012.
[7] H. Stewénius, *Gröbner Basis Methods for Minimal Problems in Computer Vision*, Ph.D. thesis, Lund University, April 2005.
[8] Y. Kuang, S. Burgess, A. Torstensson, and K. Åström, "A complete characterization and solution to the microphone position self-calibration problem," in *Proc. of ICASSP*, 2013.
[9] M. Pollefeys and D. Nister, "Direct computation of sound and microphone locations from time-difference-of-arrival data," in *Proc. of ICASSP*, 2008.
[10] J. Wendeberg and C. Schindelhauer, "Polynomial time approximation algorithms for localization based on unknown signals," in *ALGOSENSORS*, 2012.
[11] E. Ask, S. Burgess, and K. Åström, "Minimal structure and motion problems for toa and tdoa measurements with collinearity constraints," in *ICPRAM*, 2013.
[12] F. Jiang, Y. Kuang, and K. Åström, "Time delay estimation for tdoa self-calibration using truncated nuclear norm," in *Proc. of ICASSP*, 2013.
[13] N. D. Gaubitch, W. B. Kleijn, and R. Heusdens, "Auto-localization in ad-hoc microphone arrays," in *ICASSP*, 2013.
[14] M. A. Fischler and R. C. Bolles, "Random sample consensus: a paradigm for model fitting with applications to image analysis and automated cartography," *Communications of the ACM*, vol. 24, no. 6, pp. 381-95, 1981.
[15] Daniel R. Grayson and Michael E. Stillman, "Macaulay2," http://www.math.uiuc.edu/Macaulay2/.
[16] M. Byröd, K. Josephson, and K. Åström, "Fast and stable polynomial equation solving and its application to computer vision," *IJCV*, 2009.
[17] Y T Chan and K C Ho, "A simple and efficient estimator for hyperbolic location," *Signal Processing, IEEE Transactions on*, vol. 42, no. 8, pp. 1905-1915, 1994.

End of Appendix I

We claim:

1. A system, comprising: at least one processor; and at least one memory storing program instructions that, when executed by the at least one processor, cause the system to: send an acoustic ranging transmitter signal between a plurality of calibration reference positions and at least one anchor point, receive an acoustic ranging receiver signal associated with the acoustic ranging transmitter signal and with distances between the plurality of calibration reference positions and the at least one anchor point, and estimate a speed of sound, a signal acquisition delay, and a position of the at least one anchor point based on the acoustic ranging receiver signal.

2. The system of claim 1, wherein the signal acquisition delay is associated with a time difference between the sending of the acoustic ranging transmitter signal and the receiving of the acoustic ranging receiver signal.

3. The system of claim 2, wherein the at least one memory stores program instructions that, when executed by the at least one processor, cause the system to estimate a position of an object based on the estimates of the speed of sound, the signal acquisition delay, and the position of the at least one anchor point.

4. The system of claim 2, wherein the estimating the signal acquisition delay is based on (i) a peak cross-correlation between the acoustic ranging receiver signal and a signature signal and (ii) a signature time of the signature signal.

5. The system of claim 1, wherein the sending the acoustic ranging transmitter signal between the plurality of calibration reference positions and the at least one anchor point is from the plurality of calibration reference positions to the at least one anchor point.

6. The system of claim 1, wherein the sending the acoustic ranging transmitter signal between the plurality of calibration reference positions and the at least one anchor point is from the at least one anchor point to the plurality of calibration reference positions.

7. The system of claim 1, wherein the at least one anchor point includes a plurality of anchor points and wherein the estimation of the speed of sound is based on a time difference of arrival of the acoustic ranging receiver signal.

8. The system of claim 7, wherein the calibration reference positions are unknown.

9. The system of claim 8, wherein the plurality of anchor points includes a quantity of anchor points defined in relation to the number of calibration reference positions that does not under-determine a corresponding system of equations.

10. The system of claim 7, further comprising estimating the positions of the plurality of anchor points based on a time of arrival of the acoustic ranging receiver signals, and the speed of sound estimate.

11. The system of claim 7, further comprising jointly estimating positions of the plurality of anchor points with the estimate of the speed of sound and the signal acquisition delay.

12. The system of claim 1, wherein the estimating is based on a time of arrival between the sending of the acoustic ranging transmitter signal and the receiving of the acoustic ranging receiver signal for each calibration reference position and the at least one anchor point.

13. The system of claim 12, wherein the estimating includes optimizing a performance criterion associated with N calibration parameters, wherein the quantity of the plurality of calibration reference positions is at least N+1.

14. The system of claim 1, further comprising at least one acoustic transmitter situated to send the acoustic ranging transmitter signal; and
at least one acoustic receiver situated to receive the acoustic ranging receiver signal.

15. The system of claim 14, wherein the at least one acoustic transmitter and the at least one acoustic receiver are in wireless communication with the at least one processor and the at least one memory.

16. The system of claim 1, wherein the estimate of the speed of sound is obtained with a nonlinear regression.

17. The system of claim 16, wherein the nonlinear regression includes a minimization of an error based on least squares.

18. The system of claim 1, wherein acoustic the ranging transmitter signal is a wideband acoustic signal.

19. The system of claim 1, wherein the at least one anchor point includes an acoustic transmitter or an acoustic receiver.

20. The system of claim 19, wherein the acoustic transmitter is a speaker and the acoustic receiver is a microphone.

21. A method, comprising:
sending an acoustic ranging transmitter signal between a plurality of calibration reference positions and at least one anchor point;
receiving an acoustic ranging receiver signal associated with the acoustic ranging transmit signal and with distances between the plurality of calibration reference positions and the at least one anchor point; and
estimating a speed of sound, a signal acquisition delay, and a position of the at least one anchor point based on the acoustic ranging receiver signal.

22. A method, comprising: positioning an acoustic transmitter at each of a plurality of calibration reference positions; at each calibration reference position, sending an acoustic ranging transmitter signal from the acoustic transmitter and receiving the acoustic ranging transmitter signal with one or more acoustic receivers situated at respective anchor points of an acoustic detection volume; and estimating a speed of sound, a signal acquisition delay, and a position of the at least one anchor point based on the received acoustic ranging transmitter signals.

\* \* \* \* \*